United States Patent
Liu et al.

(10) Patent No.: US 11,509,372 B2
(45) Date of Patent: Nov. 22, 2022

(54) CAPABILITY INFORMATION FOR SOUNDING REFERENCE SIGNAL IMPROVEMENTS

(71) Applicant: QUALCOMM Incorporated, San Diego, CA (US)

(72) Inventors: Le Liu, Fremont, CA (US); Alberto Rico Alvarino, San Diego, CA (US); Prashanth Akula, Lake Bluff, IL (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/863,732

(22) Filed: Apr. 30, 2020

(65) Prior Publication Data

US 2020/0350970 A1    Nov. 5, 2020

Related U.S. Application Data

(60) Provisional application No. 62/842,972, filed on May 3, 2019.

(51) Int. Cl.
*H04B 7/06*      (2006.01)
*H04W 72/04*   (2009.01)
(Continued)

(52) U.S. Cl.
CPC ........... *H04B 7/0628* (2013.01); *H04B 1/713* (2013.01); *H04B 17/336* (2015.01);
(Continued)

(58) Field of Classification Search
CPC .......................... H04B 7/0628; H04W 72/0413
See application file for complete search history.

(56) References Cited

U.S. PATENT DOCUMENTS

2019/0068260 A1* 2/2019 Yan ..................... H04B 7/0404
2019/0159080 A1* 5/2019 Zhang .................... H04L 25/02
(Continued)

OTHER PUBLICATIONS

Huawei, et al., "Feature Summary on LTE DL MIMO Efficiency Enhancement", 3GPP Draft, 3GPP TSG RAN WG1 Meeting #96, R1-1903295 Feature Summary on LTE DL MIMO Efficiency Enhancement_V2, 3rd Generation Partnership Project (3GPP), Mobile Competence Centre, 650, Route Des Lucioles, F-06921 Sophia-Antipoli, vol. RAN WG1. No. Athens, Greece, Feb. 25, 2019-Mar. 2, 2019 Feb. 27, 2019 (Feb. 27, 2019), XP051600980, 15 Pages, Retrieved from the Internet: URL:http://www.3gpp.org/ftp/tsg%5Fran/WG1%5FRL1/TSGR1%5F96/Docs/R1%2D1903295%2Ezip [retrieved on Feb. 27, 2019] paragraph [3.1Huaweiproposal], paragraph [3.1page4], paragraph [3.2.2Proposal 3], paragraphs [3.2.3],[3.2.7], [0004].

(Continued)

*Primary Examiner* — Zhiren Qin
(74) *Attorney, Agent, or Firm* — Qualcomm Incorporated

(57) ABSTRACT

Certain aspects of the present disclosure provide techniques for capability information for sounding reference signal (SRS) improvements. An exemplary method generally includes determining a capability of the UE related to additional sounding reference signal (SRS) transmissions in a normal uplink (UL) subframe; transmitting, to a base station (BS), capability information indicating the determined capability of the UE; receiving SRS configuration information, wherein the SRS configuration information is based, at least in part, on the capability information; and transmitting at least one SRS in accordance with the SRS configuration information.

24 Claims, 17 Drawing Sheets

(51) Int. Cl.
  *H04B 17/336*  (2015.01)
  *H04B 1/713*   (2011.01)
  *H04L 5/00*    (2006.01)

(52) U.S. Cl.
  CPC ....... *H04L 5/0048* (2013.01); *H04W 72/0413* (2013.01); *H04W 72/0446* (2013.01)

(56) References Cited

U.S. PATENT DOCUMENTS

| | | | | |
|---|---|---|---|---|
| 2020/0373987 | A1* | 11/2020 | Noh | H04B 7/0628 |
| 2021/0083825 | A1* | 3/2021 | Choi | H04L 1/06 |
| 2021/0159962 | A1* | 5/2021 | Zhang | H04W 72/048 |
| 2021/0167821 | A1* | 6/2021 | Chen | H04B 7/0408 |
| 2021/0194737 | A1* | 6/2021 | Gao | H04W 72/0446 |
| 2021/0288767 | A1* | 9/2021 | Liu | H04W 72/042 |

OTHER PUBLICATIONS

International Search Report and Written Opinion—PCT/US2020/031054—ISA/EPO—dated Aug. 3, 2020.
Qualcomm Incorporated: "Additional SRS Symbols", 3GPP Draft, 3GPP TSG-RAN WG1 #96bis, R1-1904532 SRS Additional Symbols, 3rd Generation Partnership Project (3GPP), Mobile Competence Centre, 650, Route Des Lucioles, F-06921 Sophia-Antipolls Cedex, France, vol. RAN WG1. No. Xi 'an, China, Apr. 8, 2019-Apr. 12, 2019 Apr. 7, 2019 (Apr. 7, 2019), XP051699762, pp. 1-9, Retrieved from the Internet: URL:http://www.3gpp.org/ftp/Meetings%5F3GPP%5FSYNC/RAN1/Docs/R1%2D1904532%2Ezip [retrieved on Apr. 7, 2019] paragraphs [0001] [0002] [0004] [0005] [0006] [0007] [0008].

* cited by examiner

CAPABILITY INFORMATION FOR SOUNDING REFERENCE SIGNAL IMPROVEMENTS

CLAIM OF PRIORITY UNDER 35 U.S.C. § 119

This application claims benefit of U.S. Provisional Patent Application Ser. No. 62/842,972, filed May 3, 2019, which is assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for capability information for sounding reference signal (SRS) configuration improvements.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications in a network by a user equipment (UE). The method generally includes determining a capability of the UE related to additional sounding reference signal (SRS) transmissions in a normal uplink (UL) subframe; transmitting, to a base station (BS), capability information indicating the determined capability of the UE; receiving SRS configuration information, wherein the SRS configuration information is based, at least in part, on the capability information; and transmitting at least one SRS in accordance with the SRS configuration information.

Certain aspects provide an apparatus for wireless communications in a network by a user equipment (UE). The apparatus generally includes at least one processor configured to determine a capability of the UE related to additional sounding reference signal (SRS) transmissions in a normal uplink (UL) subframe; transmit, to a base station (BS), capability information indicating the determined capability of the UE; receive SRS configuration information, wherein the SRS configuration information is based, at least in part, on the capability information; and transmit at least one SRS in accordance with the SRS configuration information. The apparatus also generally includes a memory coupled with the at least one processor.

Certain aspects provide an apparatus for wireless communications in a network by a user equipment (UE). The apparatus generally includes means for determining a capability of the UE related to additional sounding reference signal (SRS) transmissions in a normal uplink (UL) subframe; means for transmitting, to a base station (BS), capability information indicating the determined capability of the UE; means for receiving SRS configuration information, wherein the SRS configuration information is based, at least in part, on the capability information; and means for transmitting at least one SRS in accordance with the SRS configuration information.

Certain aspects provide a non-transitory computer-readable medium for wireless communications in a network by a user equipment (UE). The non-transitory computer-readable medium generally includes instructions that, when executed by at least one processor, configure the at least one processor to determine a capability of the UE related to additional sounding reference signal (SRS) transmissions in a normal uplink (UL) subframe; transmit, to a base station (BS), capability information indicating the determined capability of the UE; receive SRS configuration information, wherein the SRS configuration information is based, at least in part, on the capability information; and transmit at least one SRS in accordance with the SRS configuration information.

Certain aspects provide a method for wireless communications in a network by a base station (BS). The method generally includes receiving, from a user equipment (UE), capability information indicating a capability of the UE related to additional sounding reference signal (SRS) transmissions in a normal uplink (UL) subframe; transmitting SRS configuration information to the UE, wherein the SRS configuration information is based, at least in part, on the received capability information; and receiving at least one SRS transmitted in accordance with the SRS configuration information.

Certain aspects provide an apparatus for wireless communications in a network by a base station (BS). The apparatus generally includes at least one processor configured to receive, from a user equipment (UE), capability information indicating a capability of the UE related to additional sounding reference signal (SRS) transmissions in a normal uplink (UL) subframe; transmit SRS configuration information to the UE, wherein the SRS configuration information is based, at least in part, on the received capability information; and receive at least one SRS transmitted in accordance with the SRS configuration information. The apparatus also generally includes a memory coupled with the at least one processor.

Certain aspects provide an apparatus for wireless communications in a network by base station (BS). The apparatus generally includes means for receiving, from a user equipment (UE), capability information indicating a capability of the UE related to additional sounding reference signal (SRS) transmissions in a normal uplink (UL) subframe; means for transmitting SRS configuration information to the UE, wherein the SRS configuration information is based, at least in part, on the received capability information; and means for receiving at least one SRS transmitted in accordance with the SRS configuration information.

Certain aspects provide a non-transitory computer-readable medium for wireless communications in a network by base station (BS). The non-transitory computer-readable medium generally includes instructions that, when executed by at least one processor, configure the at least one processor to receive, from a user equipment (UE), capability information indicating a capability of the UE related to additional sounding reference signal (SRS) transmissions in a normal uplink (UL) subframe; transmit SRS configuration information to the UE, wherein the SRS configuration information is based, at least in part, on the received capability information; and receive at least one SRS transmitted in accordance with the SRS configuration information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for capability information for sounding reference signal (SRS) improvements. For example, in some cases, the UE may determine a capability of the UE related to a transient time for one or more switching procedures performed during SRS transmissions or a power change limitation when performing the SRS transmissions. The UE may provide the capability information to a base station in a network. The base station may use the capability information received from the UE to determine SRS configuration information to improve SRS transmissions by the UE.

The following description provides examples of RRC configuration for A-SRS on additional SRS symbols, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
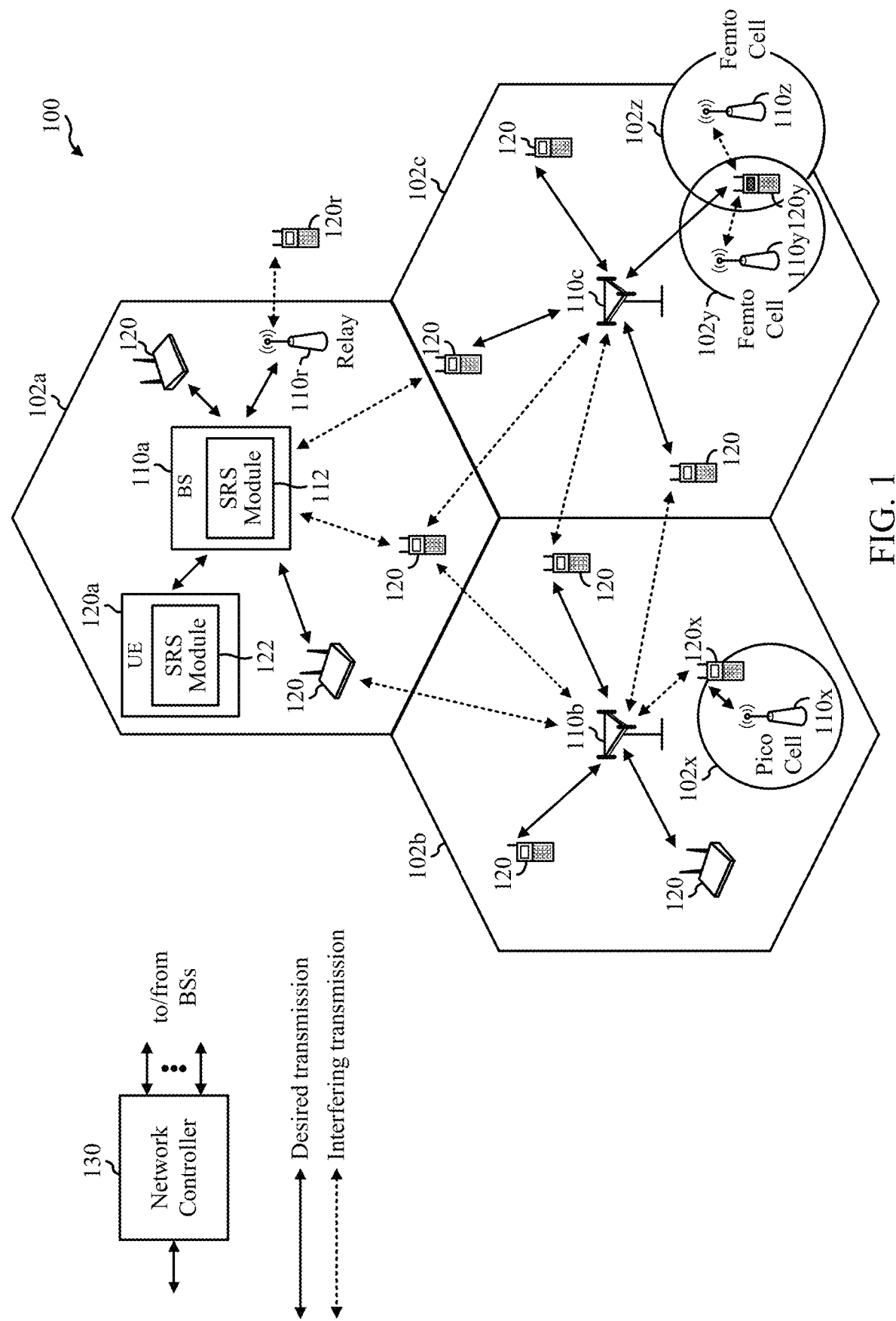
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipments (UEs) 120 in the wireless communication network 100. The UEs 120 may be dispersed throughout the wireless communication network 100, and each UE 120 may be stationary or mobile.

According to certain aspects, the BSs 110 and UEs 120 may be configured for aperiodic SRS transmission on additional SRS symbol as described herein. As shown in FIG. 1, the BS 110a includes a sounding reference signal (SRS) module 112. The SRS module 112 may be configured to perform the operations illustrated in one or more of FIGS. 8 and 14, as well as other operations disclosed herein for capability information for SRS configuration improvements, in accordance with aspects of the present disclosure. Additionally, as shown in FIG. 1, the UE 120a includes a SRS module 122. The SRS module 122 may be configured to perform the operations illustrated in one or more of FIGS. 7 and 13, as well as other operations disclosed herein for capability information for SRS configuration improvements, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
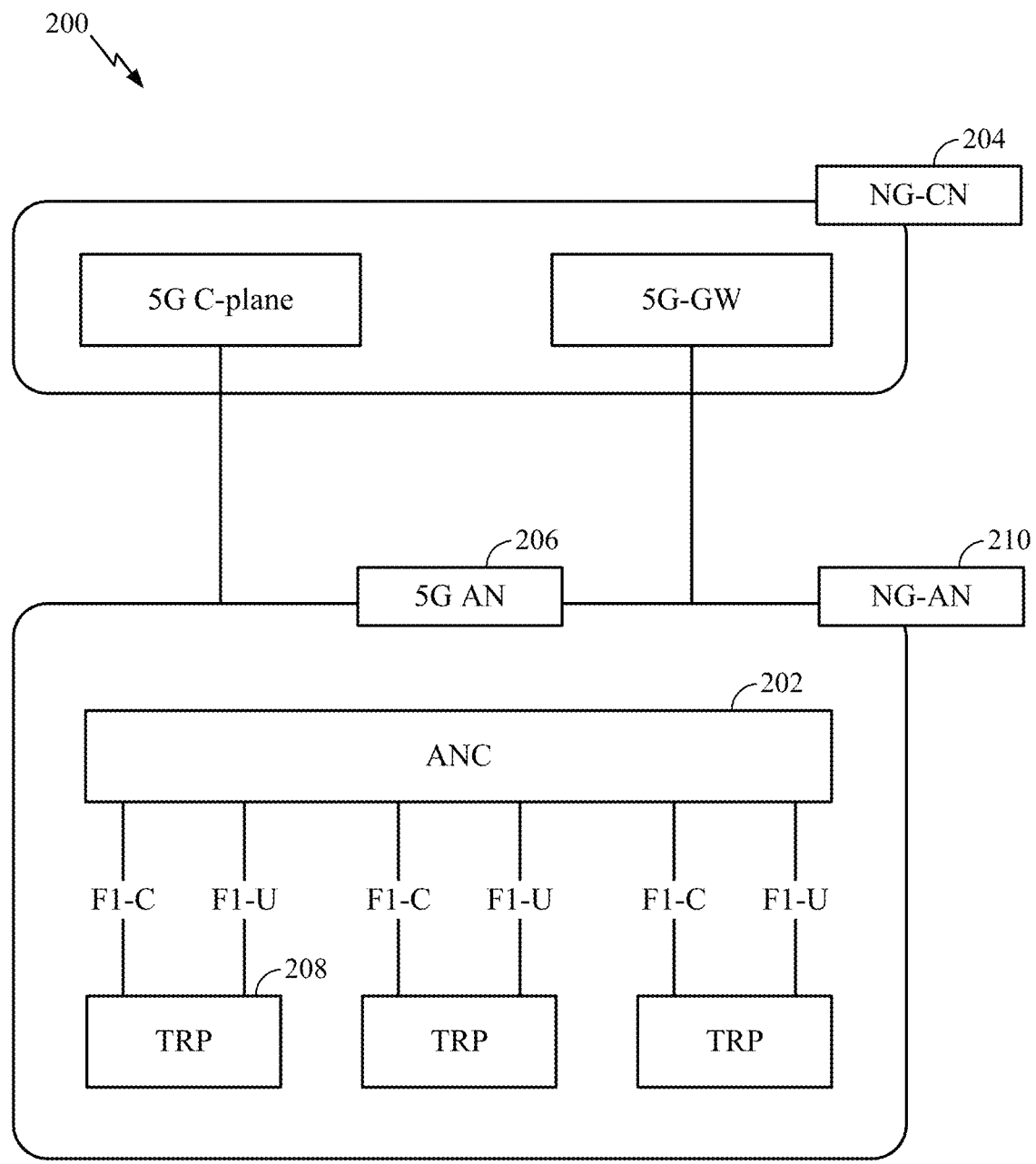
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
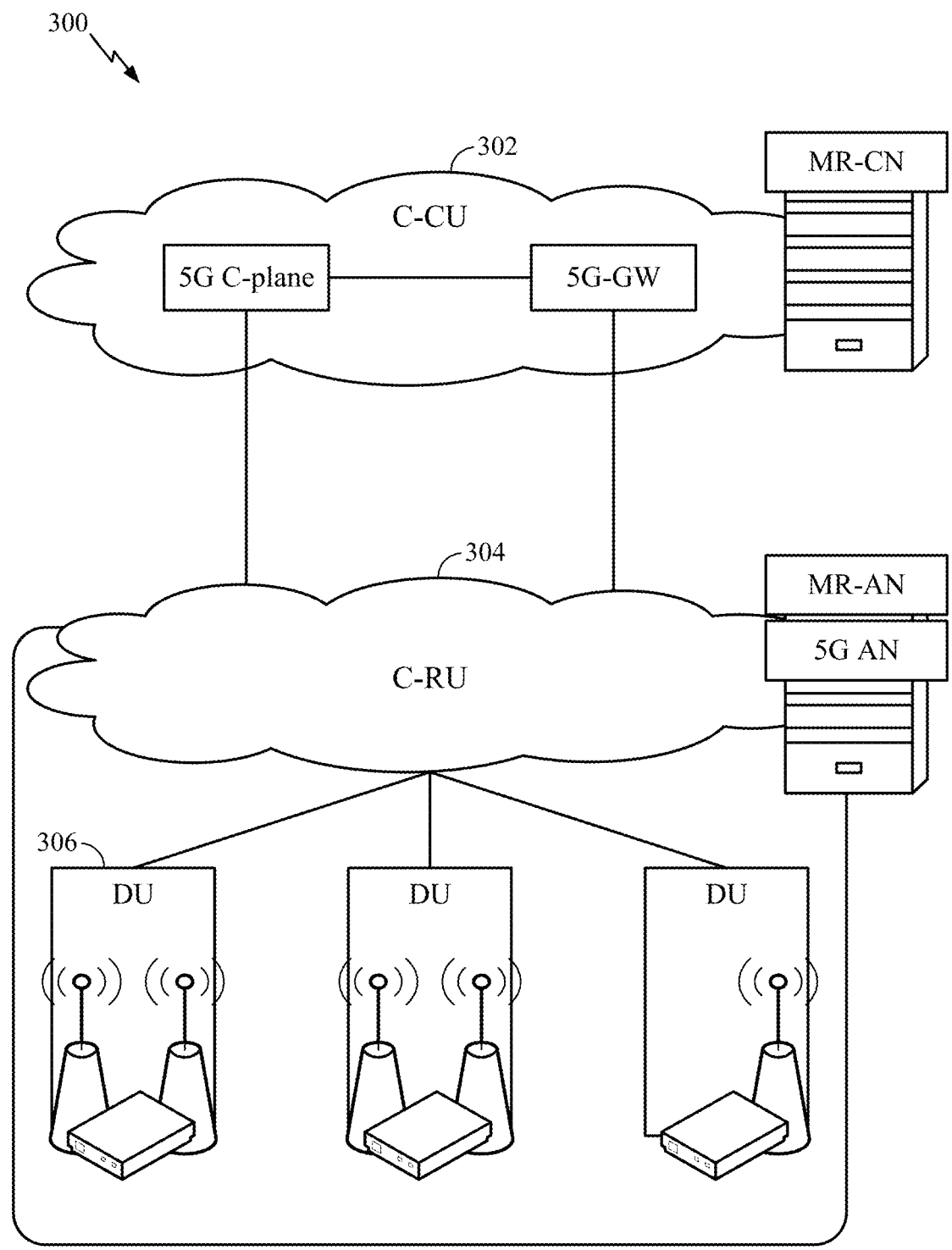
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
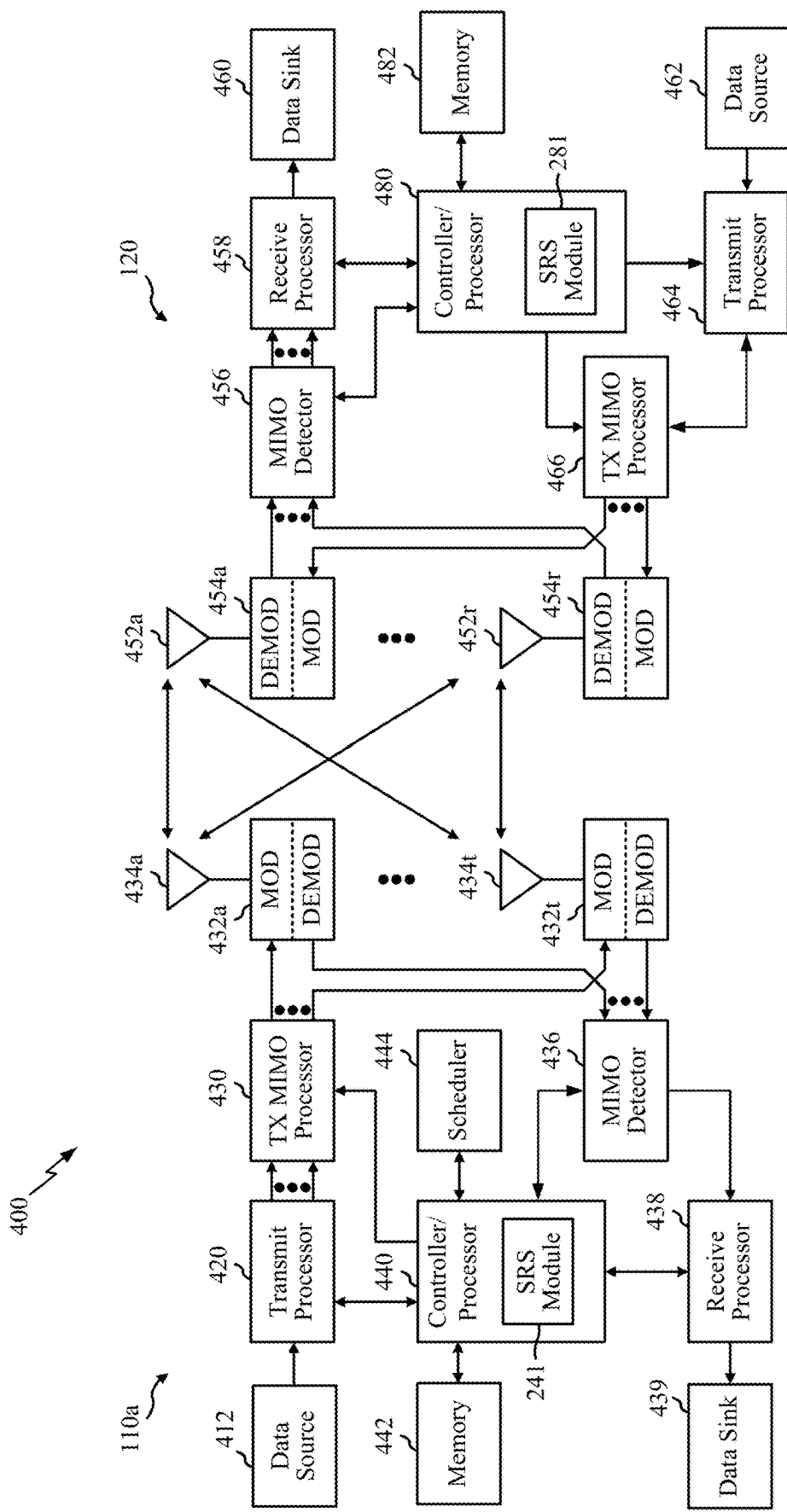
FIG. 4 is a block diagram conceptually illustrating a design of an example base station (BS) and user equipment (UE), in accordance with certain aspects of the present disclosure.

FIG. 4 illustrates example components of BS 110*a* and UE 120*a* (e.g., in the wireless communication network 100 of FIG. 1), which may be used to implement aspects of the present disclosure.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432*a*-432*t*. Each modulator in transceivers 432*a*-432*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 434*a*-434*t*, respectively.

At the UE 120*a*, the antennas 452*a*-452*r* may receive the downlink signals from the BS 110*a* and may provide received signals to the demodulators (DEMODs) in transceivers 454*a*-454*r*, respectively. Each demodulator in transceivers 454*a*-454*r* may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454*a*-454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a*-454*r* (e.g., for SC-FDM, etc.), and transmitted to the BS 110*a*. At the BS 110*a*, the uplink signals from the UE 120*a* may be received by the antennas 434, processed by the modulators in transceivers 432*a*-432*t*, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The memories 442 and 482 may store data and program codes for BS 110*a* and UE 120*a*, respectively. A scheduler 444 may schedule UEs for data transmission on the downlink and/or uplink.

The controller/processor 480 and/or other processors and modules at the UE 120*a* may perform or direct the execution of processes for the techniques described herein. For example, as shown in FIG. 4, the controller/processor 440 of the BS 110*a* includes an SRS module 441 that may be configured to perform the operations illustrated in one or more of FIGS. 8 and 14, as well as other operations disclosed herein for capability information for SRS configuration improvements, according to aspects described herein. As shown in FIG. 4, the controller/processor 480 of the UE 120*a* includes SRS module 481 that may be configured to perform the operations illustrated in one or more of FIGS. 7 and 13, as well as other operations disclosed herein for capability information for SRS configuration improvements, according to aspects described herein. Although shown at the Controller/Processor, other components of the UE 120*a* and BS 110*a* may be used performing the operations described herein.

Figure 5:
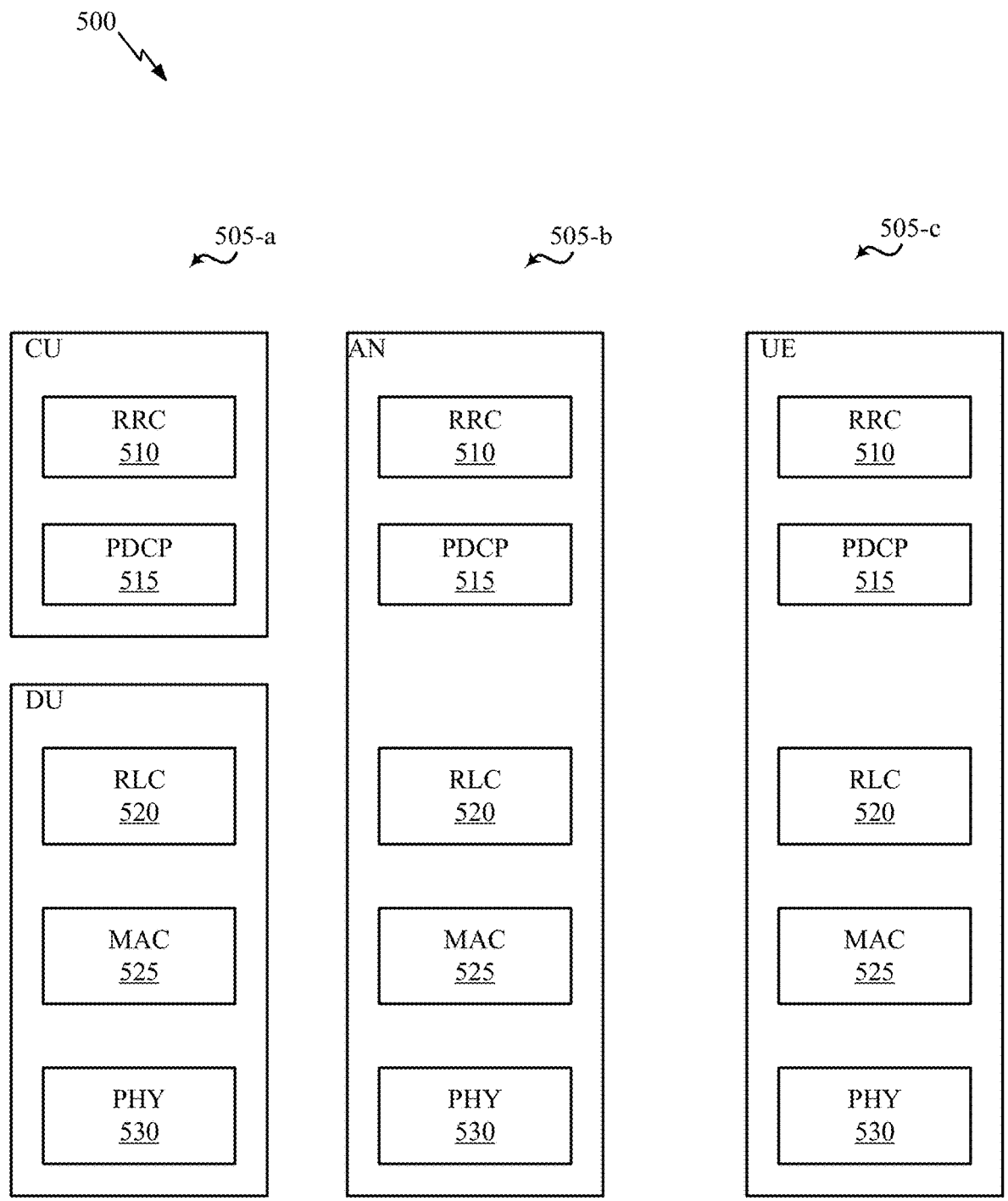
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
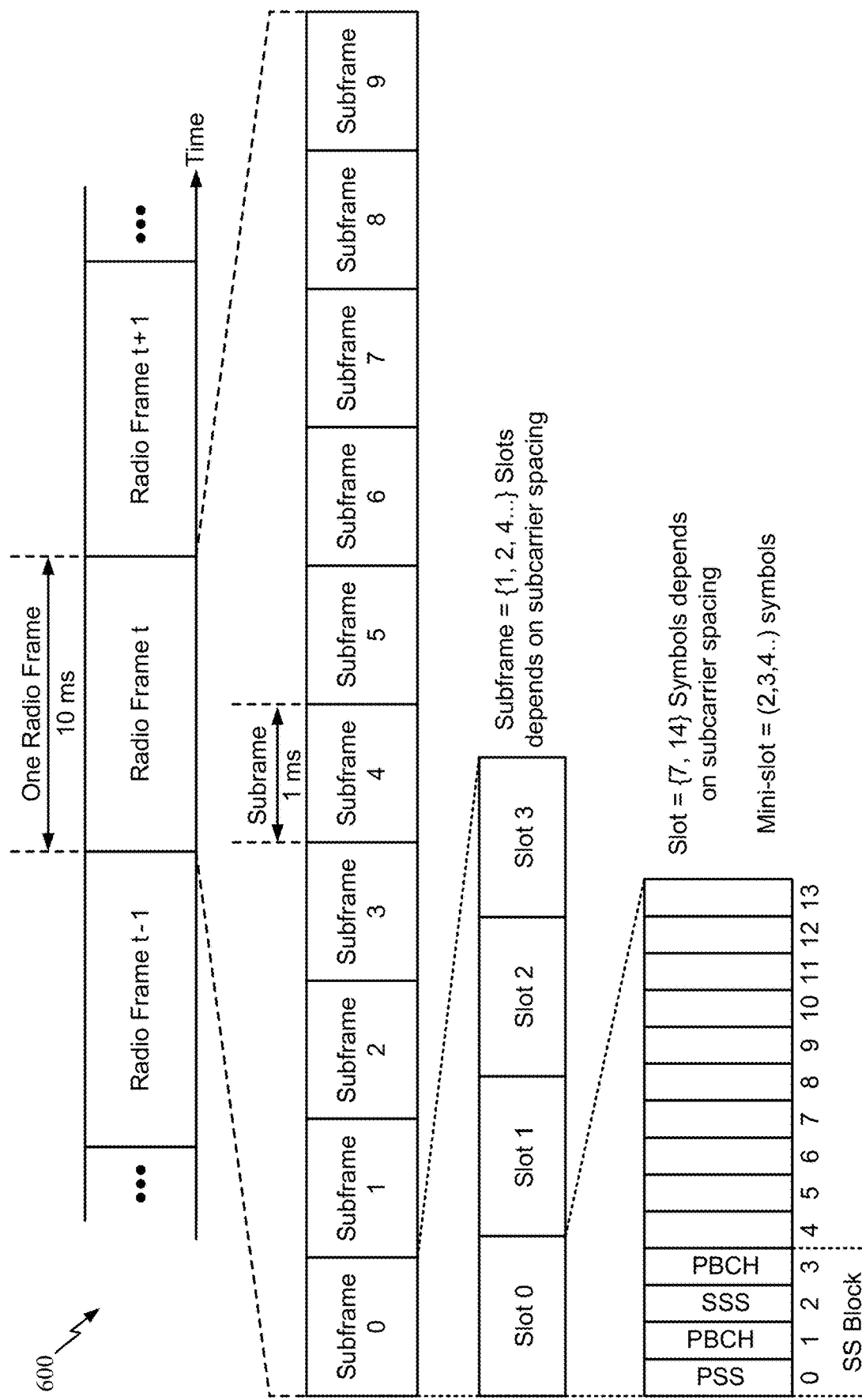
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Resource Configuration Enhancements

In wireless communication systems, such as the wireless communication system described above, user equipments (UEs) may transmit sounding reference signals (SRSs) so that the network/base station (e.g., eNBs, gNB, etc.) can measure uplink channel quality. Typically, one SRS is transmitted by a UE in a last symbol of a subframe. However, more recently, additional symbols have been introduced for transmitting SRSs in a normal uplink (UL) subframe, which can be any of $1^{st}$-$13^{th}$ symbol in a normal UL subframe and may be identified based on a virtual cell ID or physical cell ID associated with the UE that transmitted the (additional) SRSs.

Until LTE Release 15, as noted, the last symbol of a normal UL subframe is reserved for SRS transmission. Additionally, there are six uplink pilot time slot (UpPTS) symbols available for SRS transmission in special subframe, but only a maximum of two SRSs may be transmitted in an UpPTS subframe. Additionally, LTE also supports SRS antenna switching (e.g., 1T2R, 1T4R, 2T4R, where T represents the number of transmit antennas and R represents the number of receive antennas), allowing a UE with R antennas more than T SRS tx antenna ports (e.g., R>T) to switch (R/T) antennas or antenna pairs on each SRS transmit instance/opportunity. If frequency hopping is enabled together with SRS antenna switching, the SRS antenna switching and subband hopping may be concurrently carried out.

A main objective of introducing additional symbols for SRS transmission in a normal UL subframe is to increase link budget for power-limited UEs (i.e., give more opportunities to UEs to transmit SRS). Further, introducing additional SRS symbols may increase capacity in general (i.e., allow more UEs to transmit SRS, or more antennas from same UE). One straightforward way of extending link budget is by the use of repetitions (e.g., repeating transmission of an SRS), but this has the following issues.

For example, if the repetitions use the whole bandwidth of sounding, then capacity is decreased (and resources wasted). Additionally, for an edge UE with a transmit power limitation, SRS frequency hopping may be used to focus the UE tx power on a smaller narrowband and transmit SRS in different frequency locations in different SRS transmit instances/opportunities so as to perform the sounding over the whole SRS bandwidth. If the repetitions use the narrowband and frequency hopping, the UE may not be able to transmit the SRS over entire SRS bandwidth due to limitations related to time span as well as retuning/power changes. Additionally, if orthogonal cover codes (OCC) are applied on top of SRS (e.g. [++, +−] OCC over SRS repeated symbols) and if one of the symbols is lost (e.g. due to dropping/collision) then it is not possible to demultiplex each UE's SRS at the base station.

Thus, aspects of the present disclosure provide techniques for introducing new SRS resources and parameters to help alleviate the issues described above, while also maintaining backwards compatibility with legacy devices. For example, aspects of the present disclosure provide new SRS resources that may be used to send additional SRSs in addition to legacy SRS resources by non-legacy devices (e.g., in some cases, LTE Rel-16 devices) while still being backwards compatible with legacy devices (e.g., in some cases, LTE Rel-15 and older devices).

Figure 7:
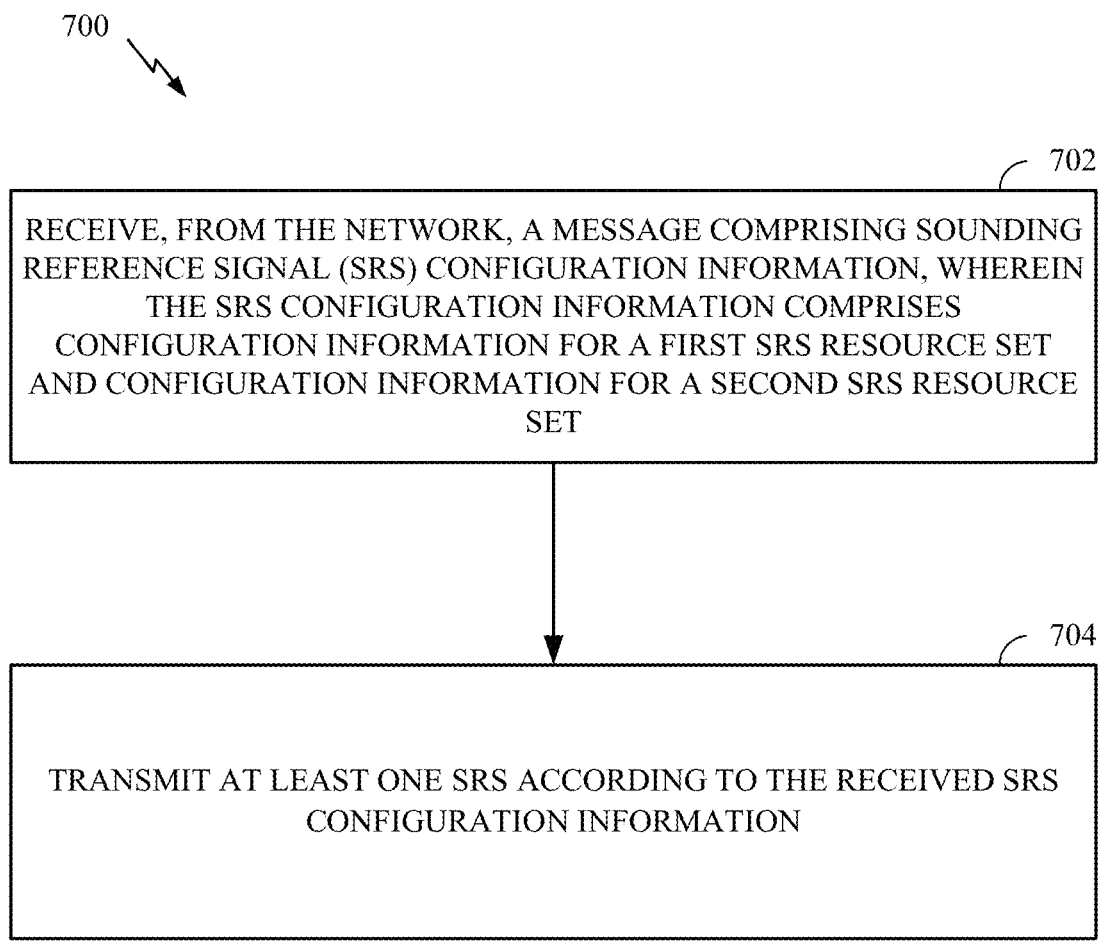
FIG. 7 illustrates example operations for wireless communications by a user equipment, in accordance with certain aspects of the present disclosure.

FIG. 7 illustrates example operations 700 for wireless communications in a network by a user equipment in a network, for example, for transmitting sounding reference signals (SRSs) to the network.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 700 begin at 702 by receiving, from the network, a message comprising sounding reference signal (SRS) configuration information, wherein the SRS configuration information comprises configuration information for a first SRS resource set and configuration information for a second SRS resource set.

At 704, the UE transmits at least one SRS according to the received SRS configuration information.

Figure 8:
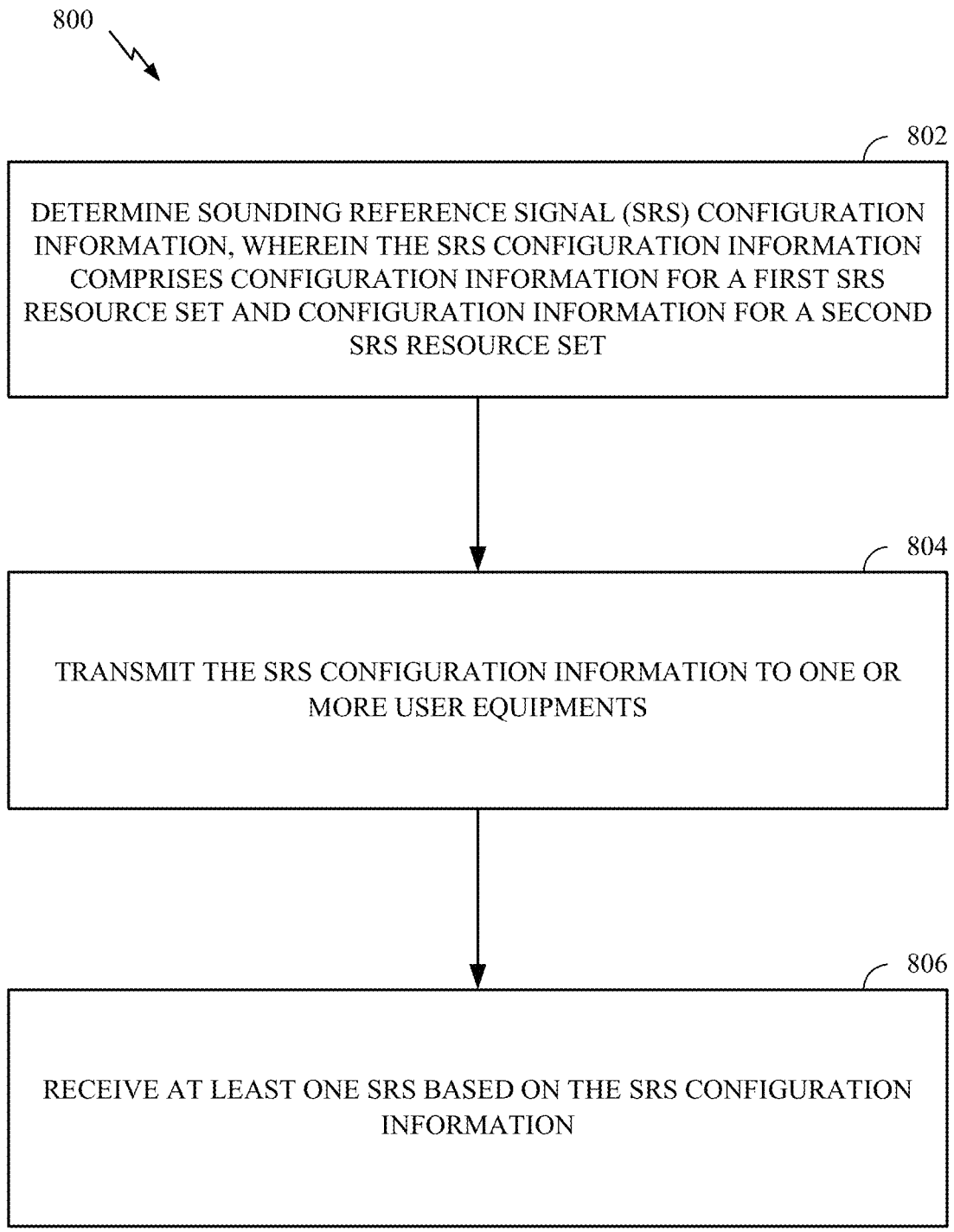
FIG. 8 illustrates example operations for wireless communications by a user equipment, in accordance with certain aspects of the present disclosure.

FIG. 8 illustrates example operations 800 for wireless communications in a network by a base station (BS), for example, for receiving sounding reference signals (SRSs). Operations 800 may be considered complementary to operations 700 performed by the UE.

According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 800 begin at 802 by determining sounding reference signal (SRS) configuration information, wherein the SRS configuration information comprises configuration information for a first SRS resource set and configuration information for a second SRS resource set.

At 804, the BS transmits the SRS configuration information to one or more user equipments.

At 806, the BS receives at least one SRS based on the SRS configuration information.

As noted above, the network may configure different SRS resource sets for use in transmitting SRSs to the network. For example, in some cases, the network may configure a first SRS resource set and a second SRS resource set and transmit SRS configuration information to the UE indicating the first and second SRS resource sets.

According to aspects, the first SRS resource set may be configured similar to that of LTE SRSs such that the first SRS resource set is easy to be multiplexed with legacy UEs, in a similar manner as the legacy UE behavior. For example, the first SRS resource set may indicate (e.g., configure) that an SRS is to be transmitted in a last symbol of a normal UL subframe or that one or (a maximum of) two SRSs are to be transmitted in an UpPTS subframe. However, the first SRS resource set may allow more flexible configuration than legacy SRS. According to aspects, when transmitting an SRS according to the first SRS resource set, the SRS sequence ID may be based on a cell ID or a configured virtual cell ID. Furthermore, the SRS sequence ID may be configured differently, e.g., for the basic SRS (i.e., in the last symbol of normal subframes and the one or two symbols in UpPTS when srs-UpPtsAdd is not enabled) and the additional SRS in UpPTS when srs-UpPtsAdd is enabled. Additionally, in some cases, when transmitting the SRS according to the first SRS resource set, the UE may need to perform power control. In such a case, the power control for the SRS may follow that of a physical uplink shared channel (PUSCH).

According to aspects, the second SRS resource set may be configured to be easy and flexible to multiplex non-legacy UEs (e.g., in some cases, Rel-16+ devices), which are able to transmit additional SRSs (e.g., more than one SRSs in a normal UL subframe or more than two SRSs in a UpPTS subframe). For example, the second SRS resource set may include N symbols per normal UL subframe or UpPTS for SRS transmission. In some cases, N equals 1, 2, 3, 4, 5, or 6 symbols. In some other cases, N equals 1, 2, 3, . . . or 13 symbols. According to aspects, SRSs transmitted according to the second SRS resource set may be transmitted with an SRS sequence ID based on a cell ID or a configured virtual cell ID. Additionally, power control for SRSs transmitted according to the second SRS resource may be the same or different from that of PUSCH, as described in greater detail below.

According to aspects, the first and second SRS resource sets may be configured by the network periodically/aperiodically, semi-persistently, or periodically with different periodicities and/or offsets. Additionally, in some cases, the network may configure the first SRS resource set and the second SRS resource set such that no SRS symbols overlap between the first SRS resource set and the second SRS resource set. In other cases, the network may configure the first SRS resource set and the second SRS resource set with overlapping SRS symbols, but may provide an explicit or implicit indication of which of the first SRS resource set or the second SRS resource set has priority. In some cases, if no explicit indication is received, the UE may assume the first SRS resource set is prioritized. In other cases, the aperiodic second SRS resource set may be prioritized over a periodic first SRS resource set. According to aspects, the UE may follow the configuration of the prioritized SRS resource set in any overlapped symbols.

Additionally, according to certain aspects, the network may configure SRS resources in the first SRS recourse set and the second SRS resource set on a per-subband and/or per-component carrier basis. For example, in some cases, the network may configure a first SRS resource in the first SRS resource set on a first subband and a second SRS resource in the first SRS resource set on a second subband. Additionally, in some cases, the network may configure a third SRS resource in the second SRS resource set on a first component carrier and a fourth SRS resource in the second SRS resource set on a second component carrier.

In some cases, the first SRS resource set may be configured for UL channel state information (CSI) acquisition. In such a case, when performing open-loop power control, the eNB may consider UL interference to set the power control parameters (e.g., set the target SINR similar as that of PUSCH). Additionally, the open-loop power control parameter, alpha, could be same or different from that of PUSCH. Further, when performing closed-loop power control, the eNB may, in some cases, indicate the same close-loop power control parameters as PUSCH or may use different close-loop power control parameters for SRS and PUSCH, as described in greater detail below.

According to aspects, in some cases, the second SRS resource set may be configured for downlink (DL) CSI acquisition. In such a case, when performing open-loop power control, the eNB/gNB may consider DL interference when setting the power control parameters. For example, the eNB may set the target SINR based on a reported DL CSI/RRM measurement. Additionally, the open-loop power control parameter, alpha, could be same or different from that of PUSCH. Further, when performing closed-loop power control, the eNB may, in some cases, indicate different close-loop power control parameters for SRS from that of PUSCH, as described in greater detail below.

According to aspects, SRS for UL CSI acquisition and DL CSI acquisition may be configured by the network periodically/aperiodically, semi-persistently, or periodically with different periodicities and/or offsets. For example, the network may configure aperiodic SRS for 2×2 UL MIMO and periodic SRS AS 2T4R for DL MIMO for the same UE.

According to aspects, SRS for UL CSI acquisition and DL CSI acquisition may be configured by the network to have different priority when a collision occurs with other uplink channels or even with another SRS. For example, the SRS for DL CSI acquisition may be prioritized for the scheduling of frequently incoming DL traffic transmission. For example, in some cases, if there is a collision between a SRS (e.g., used to schedule a PDSCH) and a PUSCH transmission, the SRS may be prioritized over the PUSCH transmission. Additionally, in some cases, if there is a collision between an SRS (e.g., used to schedule PUSCH) and a PUSCH, the SRS may be de-prioritized.

According to aspects, in some cases, the UE may need to perform power control when transmitting SRSs. Performing power control when transmitting SRSs may include determining a transmission power for transmitting the SRSs under the network control.

For example, in some cases, determining the transmission power may be based on open-loop power control configuration information. More specifically, in certain cases, when open-loop power control for additional SRS symbols (e.g., of the second SRS resource set) is different than that of PUSCH and legacy SRS (e.g., last symbol in a normal uplink subframe), the network may indicate to the UE open-loop power control configuration information/parameters (e.g., via unicast radio resource control (RRC) signaling) separately for the additional SRS symbols. According to aspects, the open-loop power control configuration may apply to additional SRS symbols (e.g., of the second SRS resource set) but not to legacy SRS (e.g., of the first SRS resource set). In some cases, the open-loop power control configuration may apply to both additional SRS symbols and legacy SRS symbols. Further, in some cases, the open-loop power control configuration information may include a power offset relative to the power of legacy SRS, or a power offset relative to the power of PUSCH, to apply to additional SRS symbols.

In some cases, a same closed-loop power control for PUSCH and/or PUCCH may be applied to legacy SRS (e.g., of the first SRS resource set). However, for additional SRS symbols, the network may configure the UE to use the same close-loop power control as legacy SRS or different than that of legacy SRS. For example, in certain cases, when the closed-loop power control is different than that of PUSCH, PUCCH, or legacy SRS, the network may indicate to the UE how and when to perform the closed-loop power control on the SRSs transmitted according to the first SRS resource set.

Additionally, in some cases, determining the transmission power may be based on a downlink control information (DCI) message. For example, in some cases, a group downlink control information (DCI) message (e.g., DCI format 3B) may be used by the network to indicate to the UE to perform closed-loop power control when transmitting SRSs, for example, via a power control command. In some cases, the DCI message may also configure the UE to transmit the SRSs and/or indicate the need for power control. In some cases, the DCI message may trigger, and indicate the need to apply power control command to, additional SRS symbols only but not legacy SRS, or both additional SRS symbols and legacy SRS if both are triggered (e.g., in a PUSCH/PUCCH carrier). According to aspects, in some cases, the PUSCH/PUCCH may not be transmitted in the same subframe where additional SRS is transmitted.

According to aspects, in some cases, the DCI message may trigger additional SRSs and/or legacy SRSs in a PUSCH/PUCCH-less carrier, and may indicate the need to apply same power control command to, the additional SRSs and/or the legacy SRSs. According to aspects, if the DCI message triggers additional SRSs and legacy SRSs in a same subframe (e.g., additional SRSs are limited to use the same UE-specific subframe set as that of aperiodic legacy SRSs), a same power control command may be applied to both additional SRS and legacy SRS. Additionally, according to aspects, if the DCI triggers additional SRSs and legacy SRSs in different subframes (e.g., additional SRSs may use the UE-specific subframe set different than that of aperiodic legacy SRSs), a same power control command may be applied to additional SRSs or legacy SRSs in a respective subframe.

In some cases, the DCI message may be for a DL/UL grant. In this case, since the DCI for the DL/UL grant only includes one power control field and when SRS is triggered by the DCI (e.g., by using an SRS request field), the power control command in the power control field of the DCI message may apply to at least one of PUSCH/PUCCH, legacy SRS, or additional SRS, which may be configurable by the base station/network or predefined for certain cases.

According to aspects, if additional SRSs are not configured, a DCI for DL grant (e.g., DCI format 1A) may trigger legacy SRS and shortened PUCCH in a same subframe (e.g., no PUSCH is triggered) and a DCI for UL grant (e.g., DCI format 0/0A/0B or DCI format 4/4A/4B) may trigger legacy SRS and shortened PUSCH in a same subframe (e.g., no PUCCH is triggered). According to aspects, if additional SRSs are configured and limited to be transmitted in a same subframe as that of aperiodic legacy SRSs, a DCI for DL/UL grant may trigger legacy SRS and additional SRS in a same subframe only (e.g., PUSCH/PUCCH are dropped from being transmitted in the same subframe and possibly transmitted in a different subframe).

According to aspects, if additional SRSs are configured and can be transmitted in a UE-specific subframe different than that of aperiodic legacy SRSs, a DCI for DL/UL grant may trigger legacy SRS plus shortened PUSCH/PUCCH in a same subframe and additional SRS in a different subframe. For example, in some cases, if SRS is triggered by a DCI for DL/UL grant, the power control command in that particular grant may apply to additional SRSs and/or legacy SRSs instead of PUSCH/PUCCH. Alternatively, in some cases, if SRS is triggered by DL/UL DCI, the power control command in the DCI for DL/UL grant may applied to PUSCH/PUCCH, legacy SRS, and additional SRS symbols. In some cases, if SRS is triggered by DL/UL DCI, the power control command in the DCI for DL/UL grant may be applied to PUSCH/PUCCH and legacy SRS only, but not to additional SRS symbols.

Additionally, in some cases, the network may include an additional power control command in DCI for DL/UL grant for performing power control for SRS. In some cases, whether the UE is to perform closed-loop power control when transmitting SRSs may follow the closed-loop parameter (e.g., g(i) specified in Sect. 5.1.2.1 of TS36.213) of the physical uplink control channel (PUCCH), for example, considering the PUCCH responds to the feedback of DL data transmission. In such a case, power control may be limited to the case what the SRS is sent on the CC with PUCCH.

As noted above, the network may configure the second SRS resource set with N symbols for SRS transmission by the UE, where N may equal 1, 2, 3, 4, 5, . . . , or 13 symbols. According to aspects, the network may indicate the number of SRS symbols and locations in a subframe in the SRS configuration information transmitted to the UE. For example, in some cases, the network may indicate the number of SRS symbols and location in a subframe using a 13-symbol or 14-symbol bitmap within a subframe, a 7-bit bitmap within the predefined half subframe, or a 7-bit bitmap together within the additional 1-bit indicated half subframe. In other cases, the network may include a start offset and consecutive N symbols to be used for SRS transmission using the second SRS resource set in the SRS configuration information.

Additionally, in some cases, the network may select one of a plurality of predefined SRS transmission patterns and provides an indication of which pattern to use in the SRS configuration information. For example, when one SRS needs to be transmitted (e.g., N=1), a first predefined pattern may include transmitting an SRS in a last symbol of a normal subframe (e.g., which may be compatible with legacy devices).

According to aspects, when N=2 and fast switching for SRS is enabled (e.g., 1T2R or 2T4R), a second pattern may include transmitting an SRS in the last two consecutive symbols of a subframe. In some cases, the second pattern may include transmitting an SRS in the last symbol at n-th subframe and transmitting an SRS in the first symbol at (n+1)-th subframe. Alternatively, and SRS may be transmitted in a first symbol and a last symbol of a same subframe. In some cases, the second pattern may include transmitting SRSs according to the following pattern corresponding to symbols: SRS, X, SRS in the last 3-symbols of an sTTI slot, where X is the gap symbol for antenna transit time.

According to aspects, when N=4 and fast switching for SRS is enabled (e.g., 1T4R), a third pattern may include transmitting an SRS in the last four symbols of a subframe, requiring no gap for switching transition time. In some cases, the third pattern may include transmitting SRSs in the last five symbols of a subframe according to the following pattern: SRS, SRS, X, SRS, SRS, keeping a maximum of two consecutive SRS symbols, similar to LTE SRS in UpPTS and also aligning with the last 2-symbol+3-symbol sTTI slots. In some cases, the third pattern may include transmitting SRSs in the last five symbols of a subframe according to the following pattern: SRS, X, SRS, X, SRS, X, SRS in last 7 symbols, requiring 1-symbol gap, X, for switching transition time. In some cases, the third pattern may include transmitting one or two SRSs in the last one or two symbols of subframe n and transmitting 3 or 2 (respectively) SRSs in the first three or two symbols of subframe n+1. Alternatively, it SRS may be transmitted in the first Y (e.g., Y=1, 2 or 3) symbol(s) at the beginning of the subframe and the last (N-Y) symbol(s) in the same subframe.

According to aspects, the SRS transmission patterns described above may be configurable based on the UE capability for switching transition time and sTTI configuration. Additionally, after receiving an indication of the SRS transmission pattern in the SRS configuration information, the UE may transmit one or more SRSs in accordance with the received transmission pattern.

Figure 9:
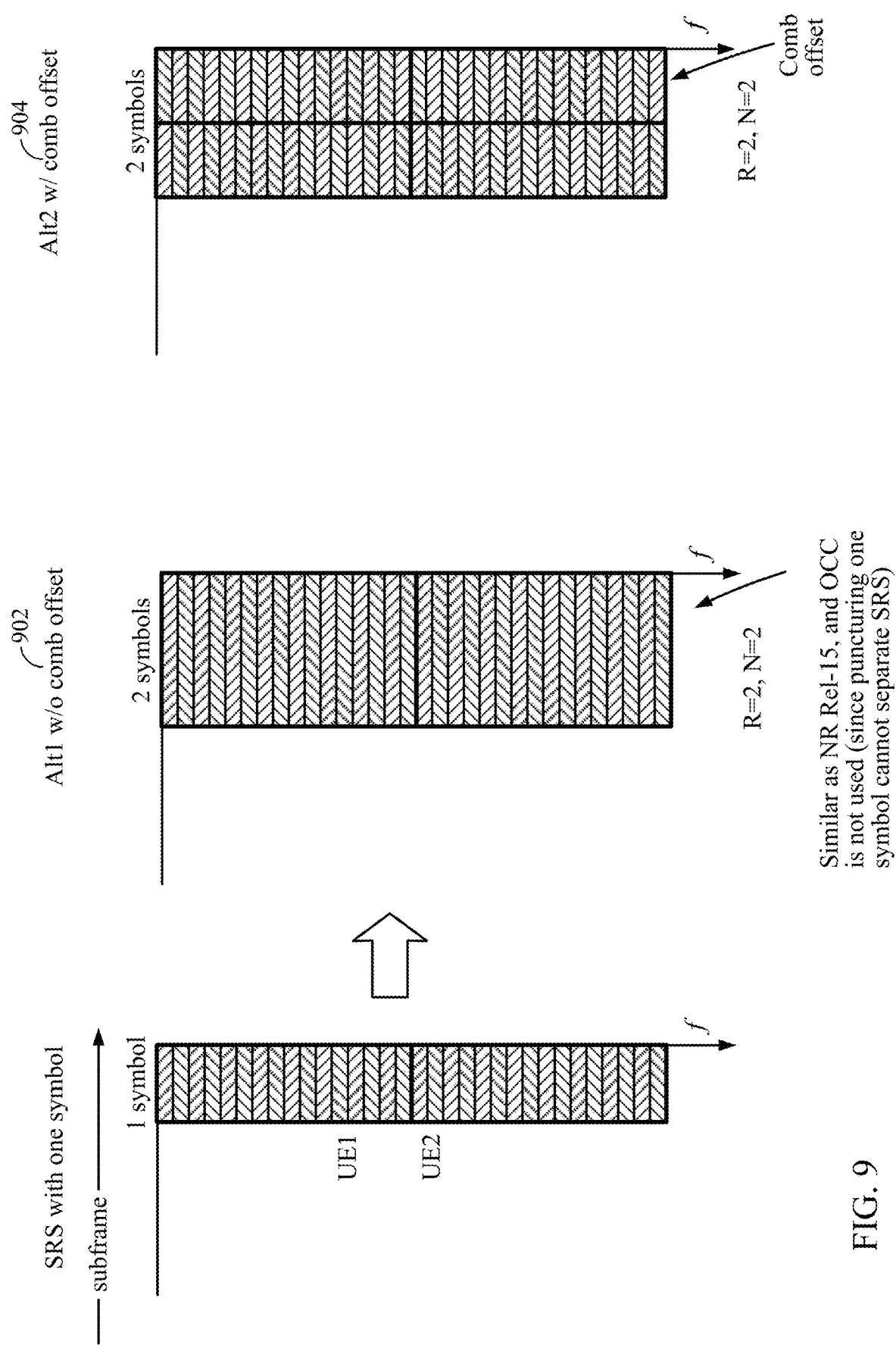
FIG. 9 illustrates example sounding reference signal (SRS) transmissions with comb offset, in accordance with certain aspects of the present disclosure.

According to aspects, in some cases, to improve and extend link budget, SRSs transmitted according to the second SRS resources set may be repeated R-times with a comb offset, for example, as illustrated in FIG. 9. For example, in some cases, as illustrated at 902, transmission of an SRS symbol by the UE may be configured to repeat R times (e.g., R=2 or 4) with same comb/comb offset/CS/subband/port. In other cases, as illustrated at 904, transmission of an SRS symbol by the UE may be configured to repeat R times (e.g., R=2 or 4) with same comb/CS/subband/port but different comb offset for channel estimation improvement.

Figure 10:
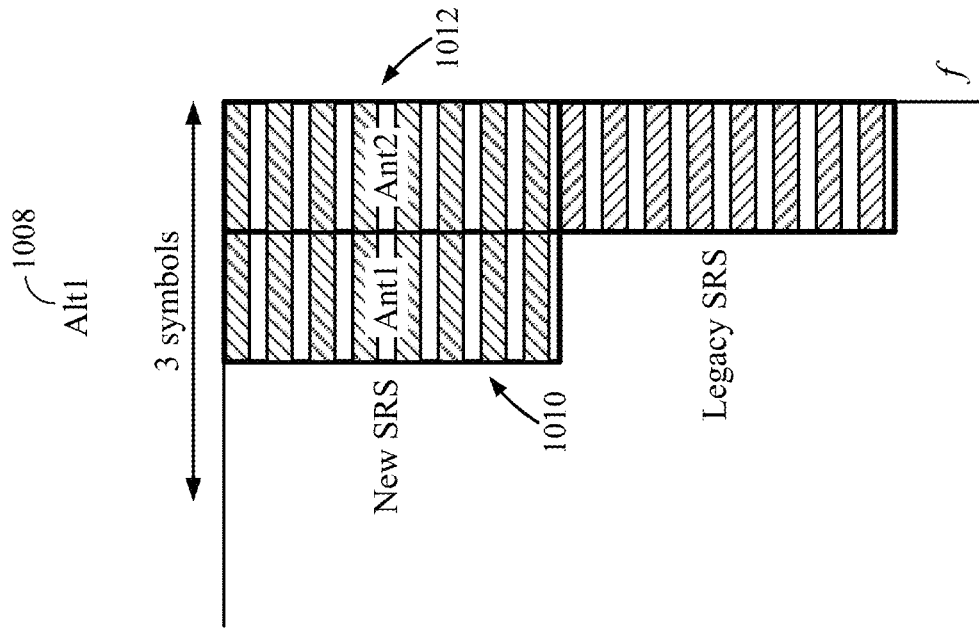
FIG. 10 illustrates example sounding reference signal (SRS) transmissions using antenna switching and frequency hopping, in accordance with certain aspects of the present disclosure.
Figure 10:
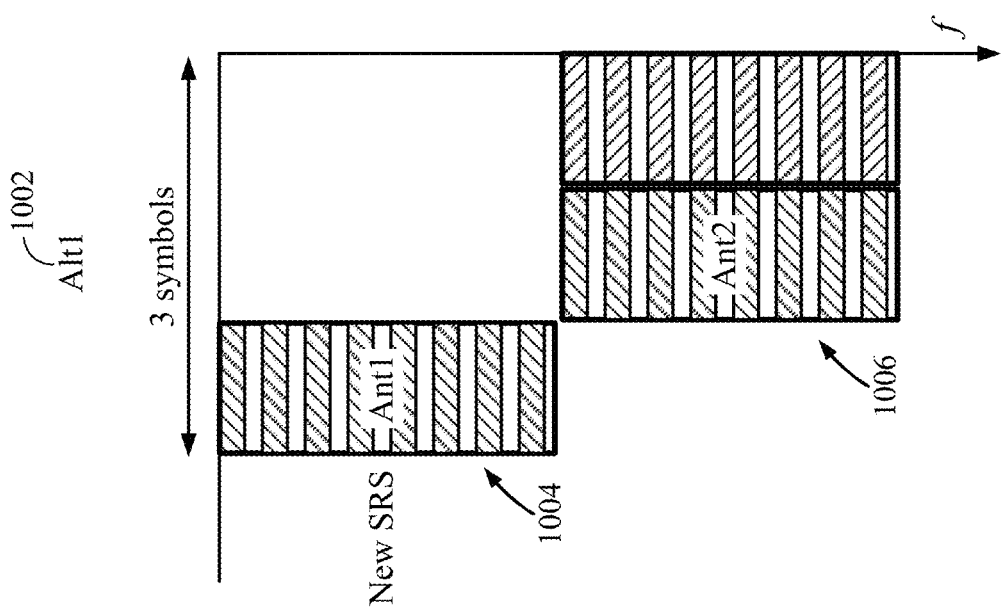

In some cases, SRS antenna switching with a configurable subband may be used by the UE when transmitting SRSs according to the second SRS resources set, as illustrated in FIG. 10. For example, in a first case as shown at 1002 in FIG. 10, if R<N, antenna switching and subband hopping may be performed concurrently by the UE (e.g., if TDM with legacy SRS). For example, as illustrated in FIG. 10, the UE may transmit a first SRS on a first subband 1004 using a first antenna and transmit a second SRS on a second subband 1006 using a second antenna.

Additionally, in a second case as shown at 1008 in FIG. 10, the UE may perform antenna switching on same subband within a subframe or within a slot when transmitting an SRS. For example, as illustrated in FIG. 10, the UE may transmit a first SRS on a first subband using a first antenna at 1010 and transmit a second SRS on the first subband using a second antenna at 1012. Note that the SRS antenna switching over the different subbands or the same subband may be configured by eNB for different scenarios. For example, when both non-legacy UE and legacy UE use frequency hopping, the non-legacy UE need to be allocated a different frequency subband in the last SRS symbol of the normal subframe to avoid the collision. The non-legacy UE with more than one symbol is configured to switch antennas over the same subband within the same subframe as legacy UE. The subband hopping may be carried out subframe by subframe, similar as that of legacy UE with only one SRS symbol per subframe.

In some cases, to gain link budget and fast sounding, the network/eNB may configure up to N SRS symbols in the same subframe (e.g., N=6 (1 slot except last symbol)). According to aspects, in some cases, when having different SRS configurations (e.g. different subbands, antennas, power control) that create power/antenna changes, it may be beneficial to sound in multiple dimensions. However, sounding in multiple dimensions introduces the problem of dropping part of the SRS symbol due to retuning/antenna switching.

Figure 11:
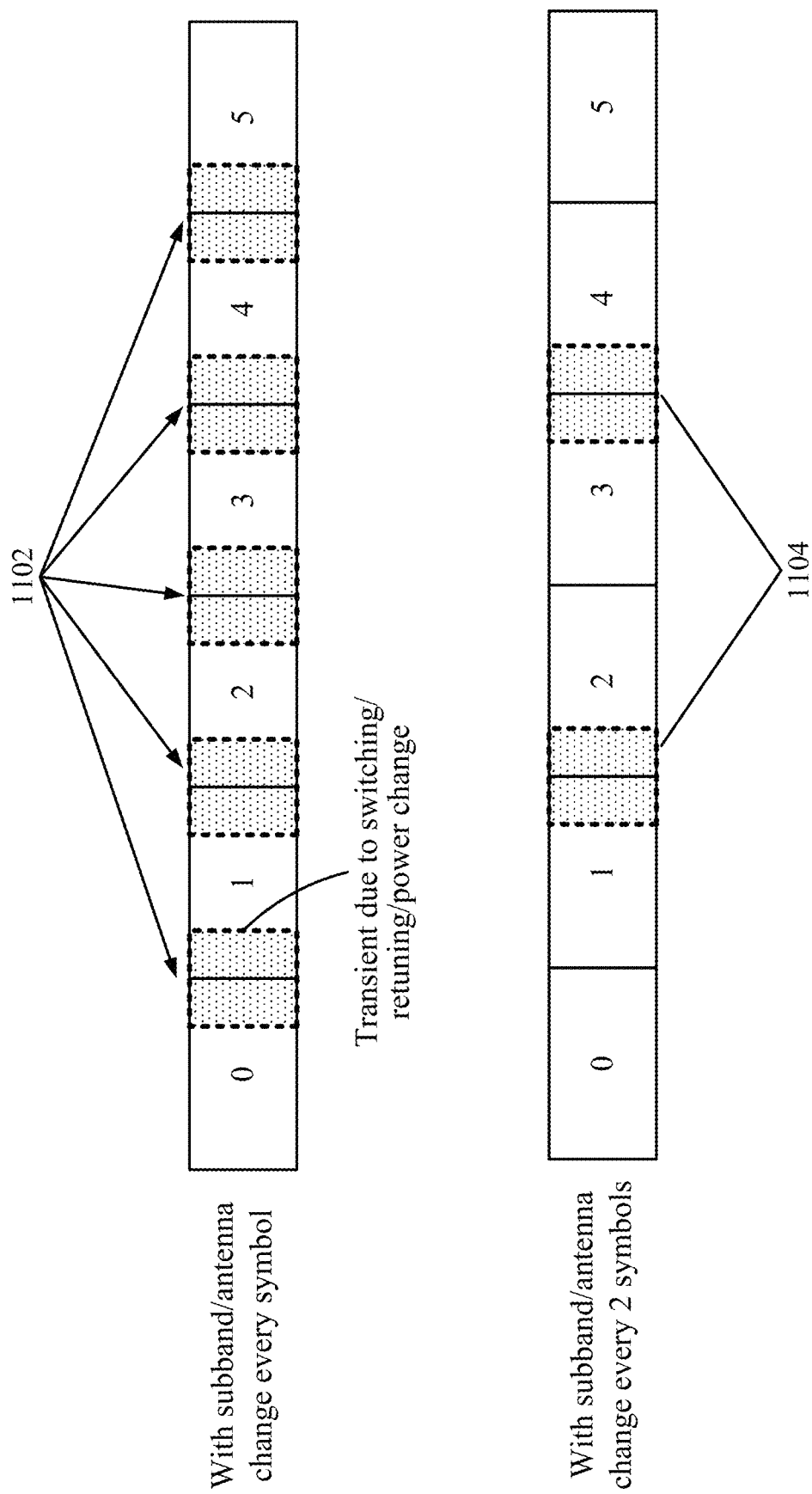
FIG. 11 illustrates example sounding reference signal (SRS) transmissions with a reduced number of subband and antenna changes, in accordance with certain aspects of the present disclosure.

Thus, aspects of the present disclosure propose techniques to help alleviate the issue of dropping parts of SRS when retuning/antenna switching by limiting the number of subband changes/antenna changes/power changes in consecutive SRS symbols, as illustrated in FIG. 11. For example, if N=6 symbols, aspects of the present disclosure propose to allow for only 3 different subbands/antennas/power changes (example can be extended to other number of different subband/antennas) (e.g., may be dependent on UE capability). For example, the network may configure 6 SRS symbols (N=6), but SRSs in symbols {0,1}, {2,3}, {4,5} are in the same subband/antenna/power (comb may change as described in previous slide, since it doesn't trigger any power change). Thus, as illustrated in FIG. 11, instead of switching antennas and retuning five times as seen at 1102, by scheduling SRSs {0,1}, {2,3}, {4,5} in the same subband/antenna/power, the number of antenna switches/retunes is reduced to two as seen at 1104, thereby reducing the portions of SRSs that are dropped. Thus, the network (e.g., bases station) and/or UE may determine a transmission pattern to reduce at least one of a number of antenna switches, subband switches, or power changes when transmitting a plurality of SRSs, wherein transmitting at least one SRS is performed based, at least in part, on the determined transmission pattern.

According to aspects, in Rel-15 LTE, a cell ID may be used as an SRS sequence ID to set group/sequence hopping (u, v) for a Zadoff-Chu (ZC) sequence root, varying subframe-by-subframe. In Rel-16 NR, a UE-specific ID may be used as an SRS sequence ID for ZC roots for all SRS symbols per UE, varying symbol-by-symbol.

Aspects of the present disclosure provide a symbol/symbol group-specific SRS ID configuration for LTE Rel-16. For example, SRSs transmitted in the last symbol of a normal subframe may use cell ID for the SRS sequence ID, while additional SRS symbols (e.g., not the last symbol of the normal subframe) may use a configured virtual cell ID. In another example of SRS in UpPTS, the SRS sequence ID for the one or two SRS (available even when srs-UpPtsAdd is not enabled) and the additional two or four SRS symbols in UpPTS (when srs-UpPtsAdd is enabled) can be configured differently.

According to aspects, if using SRS sequence ID $n_{ID}^{RS}$, which could be cell ID or configured virtual cell ID, the SRS sequence may use the sequence group number u and number v within a group to set the ZC sequence root as $$q = \lfloor N_{ZC}^{RS}(u+1)/31 + 1/2 \rfloor + v(-1)^{\lfloor 2N_{ZC}^{RS}(u+1)/31 \rfloor},$$

varying symbol-by-symbol.

According to aspects, the sequence group number u in slot $n_s$ may be defined as $u=(f_{gh}(l_0+l', n_s)+n_{ID}^{RS}) \mod 30$, where $f_{gh}(l', n_s)$ is the group hopping pattern, given by $$f_{gh}(l', n_s) = \begin{cases} \left(\sum_{i=0}^{7} (c(8(l_0 + l' + n_s \cdot N_{symb}^{slot})) + i) \cdot 2^i\right) \mod 30 \\ 0 \end{cases}$$

if group hopping is enabled,
if group hopping is disabled where $l_0+l' \; n_s \cdot N_{symb}^{slot}$ is the index of the starting SRS symbol with $N_{symb}^{slot}$ as the symbol number per slot and c(i) is the pseudo-random sequence defined by clause 7.2 of TS36.211. The pseudo-random sequence generator shall be initialized with $c_{init}=n_{ID}^{RS}$, or alternatively with $$c_{init} = \left\lfloor \frac{n_{ID}^{RS}}{30} \right\rfloor$$

at the beginning of each radio frame. Two types of $c_{init}$ for the group number u may be useful for different scenarios, e.g., $$c_{init} = \left\lfloor \frac{n_{ID}^{RS}}{30} \right\rfloor$$

works in a similar way as the legacy SRS with cell ID with good network planning to avoid collision for $n_{ID}^{RS}=0\sim29$; while, $c_{init}=n_{ID}^{RS}$ could have more SRS randomization of different UEs. The network may explicitly (e.g., by using RRC signaling or system information) or implicitly indicate which type of $c_{init}$ is used for SRS group hopping. Additionally, according to aspects, the base sequence number v within the base sequence group in slot $n_s$ may be defined as $$v = \begin{cases} c(l_0 + l' + n_s \cdot N_{symb}^{slot}) \\ 0 \end{cases}$$

if sequence hopping is enabled and grop hopping is disabled otherwise The parameter Sequence-hopping-enabled provided by higher layers determines if sequence hopping is enabled or not. c(i) is the pseudo-random sequence defined by clause 7.2 of TS36.211. The pseudo-random sequence generator may be initialized with $c_{init}=n_{ID}^{RS}$, or alternatively $$c_{init} = \left\lfloor \frac{n_{ID}^{RS}}{30} \right\rfloor \cdot 2^5 + (n_{ID}^{RS} + \Delta_{ss}) \bmod 30,$$

at the beginning of each radio frame, where $\Delta_{ss}$ could be 0 or $\Delta_{ss} \in \{0, 1, \ldots 29\}$ configured by higher layers if cell ID is used as $n_{ID}^{RS}$. Two types of $c_{init}$ for the sequence number v may be useful for different scenarios. The network may explicitly (e.g., by using RRC signaling or system information) or implicitly indicate which type of $c_{init}$ is used for SRS sequence hopping.

According to aspects, aspects provide different ways to further increase the number of non-orthogonal/orthogonal SRS sequences for UE multiplexing. For example, for a non-orthogonal way, additional symbol-specific ZC root offset over the configured R (e.g., R=2 or 4) repeated symbols may be added if both group hopping and sequence hopping are disabled, so that the SRS sequences over the R symbols are different ZC sequences with varied roots. Further, for example, for an orthogonal way, UE-group-specific comb offset/cyclic shift offset hopping over configured R (e.g., R=2 or 4) repeated symbols per slot may be added. Thus, in some cases, the UE may determine an SRS sequence with symbol-specific root configuration if group hopping or sequence hopping is enabled and determining at least one of a root based on (u, v). In some cases, the UE may determine an SRS sequence with additional ZC root offset, comb offset or cyclic shift offset configuration if both group hopping and sequence hopping are disabled.

Example Capability Information for Sounding Reference Signal Improvements

As noted above, up until LTE Release 15, the last symbol of a normal UL subframe has been reserved for SRS transmission. Additionally, there are six uplink pilot time slot (UpPTS) symbols available for SRS transmission in special subframe, but only a maximum of two SRSs may be transmitted in an UpPTS subframe. More recently, additional symbols have been introduced for transmitting SRSs in a normal uplink (UL) subframe, which can be any of $1^{st}$-$13^{th}$ symbol in a normal UL subframe. As noted, the main objective of introducing additional symbols for SRS transmission in a normal UL subframe is to increase link budget for power-limited UEs (i.e., give more opportunities to UEs to transmit SRS). Further, introducing additional SRS symbols may increase capacity in general (i.e., allow more UEs to transmit SRS, or more antennas from same UE).

Figure 12:
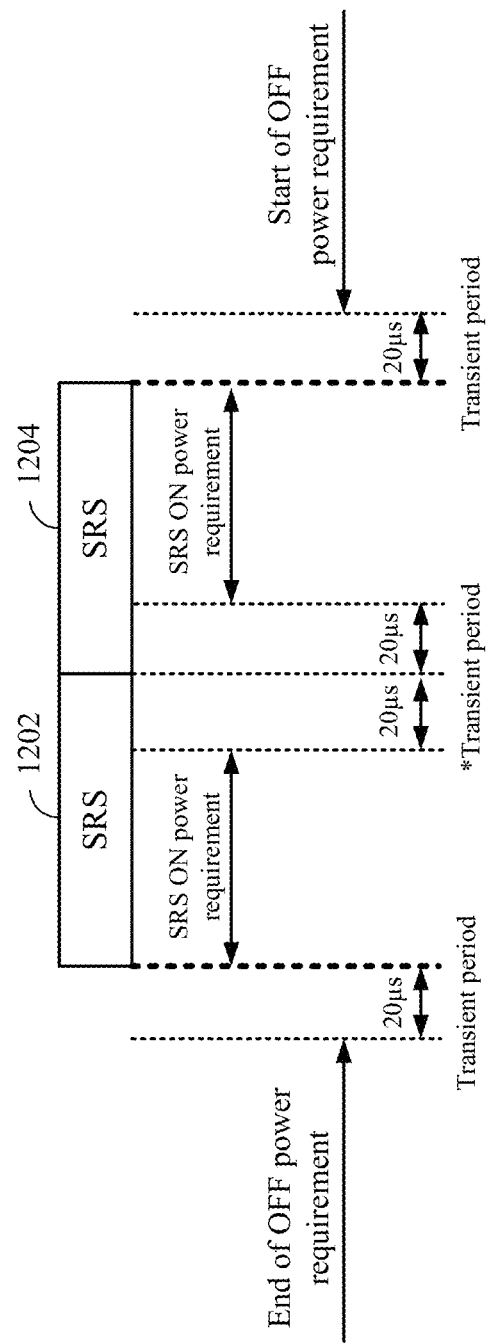
FIG. 12 illustrates example switching procedure transient time, in accordance with certain aspects of the present disclosure.

While transmitting SRS symbols, including additional SRS symbols, the UE may perform one or more of antenna switching (AS), frequency hopping (FH), or a power change between SRS symbol transmissions. In current LTE specs, a UE may require a transient time to transmit SRSs when performing antenna switching, frequency hopping, or the power change. For example, as illustrated in FIG. 12, in some cases, the transient time for AS, FH, and/or power change may comprise up to a 20 μs+20 μs (e.g., 40 μs in total) transient time between adjacent SRS symbols, such as SRS symbol 1202 and SRS symbol 1204. In some cases, for example, for shortened transmission time interval (sTTI) UEs, the transient time/period may be reduced to 10 μs+10 μs between adjacent SRS symbols where a switching procedure (e.g., AS, FH, and/or power change) occurs.

In some cases, certain UEs may require a smaller transient time for SRS FH and/or AS. For example, in some cases, certain UEs may require a transient time X1 for AS and X2 for FH, which may be different and depend on a particular UE implementation, different band, and the like. For example, in some cases, X1 may be 5 us, 10 us, or 15 us while X2 may be 2 us, 5 us, or 10 us.

Thus, as different UEs may be capable of different transient times for switching procedures that occur between SRS transmissions, aspects of the present disclosure provide techniques for improving SRS configuration and transmission. In some cases, improving SRS configuration and transmission may include a UE providing a wireless communications network (e.g., a BS in the wireless communications network) with capability information related to SRS transmissions.

For example, in some cases, the UE may provide the network with capability information that indicates a supported capability (or non-supported capability) of the UE that may include, for example, a capability related to a transient time for one or more switching procedures performed during additional SRS transmissions in a normal UL subframe. In other cases, UE may provide capability information indicating a capability related to a power change limitation when performing the SRS transmissions (e.g., max number of power changes within a time period). As described below, the network may use the capability information received from the UE to determine SRS configuration information to improve the SRS transmissions by the UE, for example, by considering one or more switching procedures or power change limitations while performing the SRS transmissions. Based on the UE capability (e.g., power change within a subframe to support intra-subframe SRS AS/FH, transient time, etc.), the network (e.g., a base station, eNB, etc.) may schedule intra-subframe SRS AS/FH to quickly achieve UL channel information across antennas/system bandwidth for DL/UL scheduling so as to improve downlink and uplink data throughput.

Figure 13:
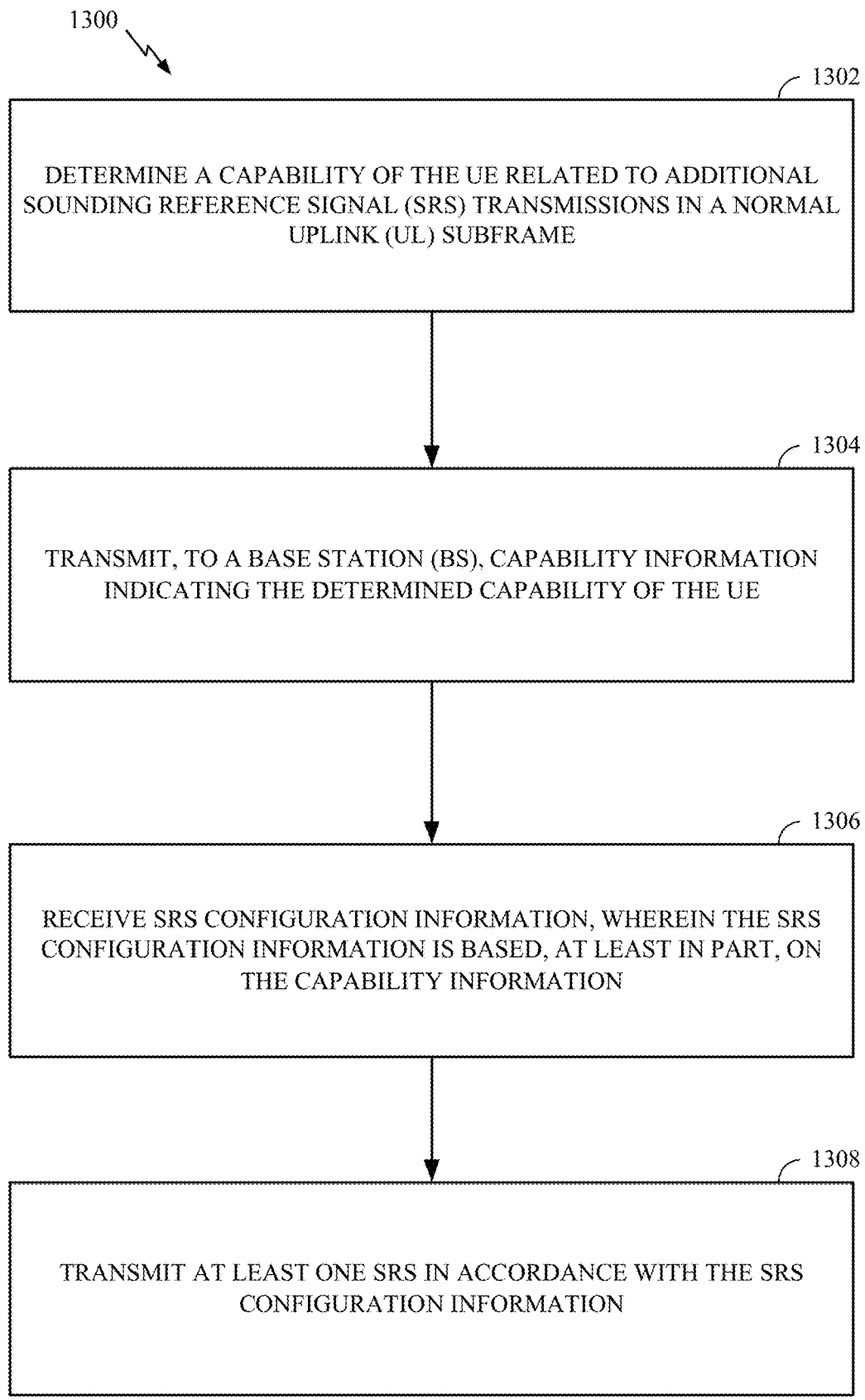
FIG. 13 illustrates example operations for wireless communications by a user equipment, in accordance with certain aspects of the present disclosure.

FIG. 13 illustrates example operations 1300 for wireless communications by a user equipment in a network, for example, for transmitting sounding reference signals (SRSs) to the network.

According to aspects, the UE may include one or more components as illustrated in FIG. 4 which may be configured to perform the operations described herein. For example, the antenna 452, demodulator/modulator in transceiver 454, controller/processor 480, and/or memory 482 as illustrated in FIG. 4 may perform the operations described herein.

Operations 1300 begin at 1302 by determining a capability of the UE related to additional sounding reference signal (SRS) transmissions in a normal uplink (UL) subframe.

At 1304, the UE transmits, to a base station (BS), capability information indicating the determined capability of the UE.

At 1306, the UE receives SRS configuration information, wherein the SRS configuration information is based, at least in part, on the capability information.

At 1308, the UE transmits at least one SRS in accordance with the SRS configuration information.

Figure 14:
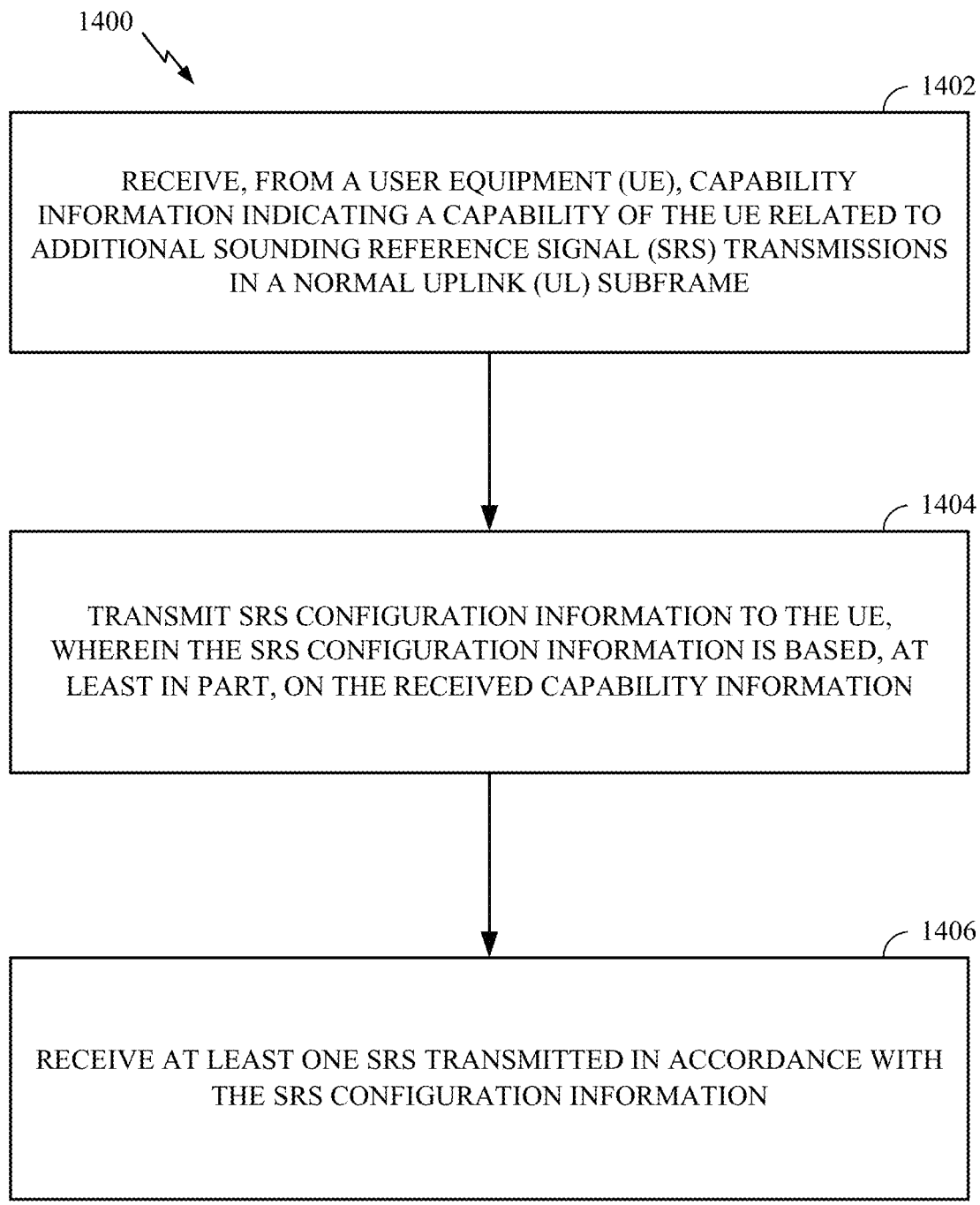
FIG. 14 illustrates example operations for wireless communications by a base station, in accordance with certain aspects of the present disclosure.

FIG. 14 illustrates example operations 1400 for wireless communications by a base station in a network, for example, for transmission of sounding reference signals (SRSs) in the network. It should be noted that operations 1400 may be considered complementary to operations 1300, and any other operations described herein, performed by the UE. In other words, it should be understood that techniques described herein with respect to operations performed by a UE may also include complementary techniques performed by a BS.

According to aspects, the BS may include one or more components as illustrated in FIG. 4 which may be configured to perform the operations described herein. For example, the antenna 434, demodulator/modulator in the transceiver 432, controller/processor 440, and/or memory 442 as illustrated in FIG. 4 may perform the operations described herein.

Operations 1400 begin at 1402 by receiving, from a user equipment (UE), capability information indicating a capability of the UE related to additional sounding reference signal (SRS) transmissions in a normal uplink (UL) subframe.

At 1404, the BS transmits SRS configuration information to the UE, wherein the SRS configuration information is based, at least in part, on the received capability information.

At 1406, the BS receives at least one SRS transmitted in accordance with the SRS configuration information. In some cases, the at least one SRS comprises an additional SRS transmission in the normal UL subframe.

As noted above, the UE may determine a capability of the UE related to additional SRS transmissions in a normal UL subframe. For example, in some cases, the determined capability may include a capability related to at least one of a transient time for one or more switching procedures performed during the additional SRS transmissions or a power change limitation when performing the additional SRS transmissions. That is, for example, the UE may determine its capability related to transient time for the one or more switching procedures performed during the SRS transmissions. Additionally or alternatively, the UE may determine its capability related to a power change limitation when performing the SRS transmissions. The UE may then transmit capability information to the base station that includes an indication of the determined capability(ies) of the UE.

According to aspects and as noted above, the one or more switching procedures may comprise at least one of an antenna switching (AS) procedure, a frequency hopping (FH) procedure, or a power change procedure. For example, in some cases, the antenna switching procedure may comprise a UE switching antennas between additional SRS transmissions (e.g., transmitting a first SRS via a first antenna and transmitting a second SRS via a second antenna, different from the first antenna). The frequency hopping procedure may comprise the UE switching frequencies when transmitting SRSs (e.g., transmitting a first SRS using a first transmission frequency and transmitting a second SRS using a second transmission frequency, different from the first transmission frequency). Additionally, the power change procedure may comprise the UE changing a transmission power between additional SRS transmissions (e.g., transmitting a first SRS at a first transmission power and transmitting a second SRS at a second transmission power, different from the first transmission power).

According to aspects, each of these switching procedures may be associated with a transient time (e.g., a time gap or symbol gap) that the UE uses to perform the switch (e.g., between antennas, frequencies, and/or power changes) between additional SRS transmissions. For example, as noted above, AS may be associated with a first transient time (e.g., time gap), FH may be associated with a second transient time (e.g., time gap), and a power change may be associated with a third transient time (e.g., time gap). According to aspects, as described below, the transient time, or time gap, may comprise a guard symbol between SRS transmissions when performing the one or more switching procedures.

According to aspects, the UE may determine its capability with respect to these transient times and provide the base station with capability information indicating the determined UE capability. In some cases, the determined capability of the UE may be determined by the UE on a per-band or per-band-group basis. For example, the UE capability in a first frequency band (e.g., a first component carrier or a first group of components carriers) may be different from the UE capability in a second frequency band (e.g., a second component carrier or a second group of components carriers) due to individual radio frequency (RF) design and/or frequency band characteristics (e.g., frequency division duplexing (FDD)/time division duplexing (TDD) band, carrier-switching capability, and the like).

In some cases, the capability information may include a reported transient time (e.g., time gap) for at least one of the antenna switching procedure, the frequency hopping procedure, or the power change procedure. For example, in some cases, the UE may include in the capability information an indication of a capability to support a transient time of X1 for AS and a transient time of X2 for FH. Additionally or alternatively, the UE may report X2 for FH only, where X1 may be fixed or in a pre-defined range with X2<X1 (e.g., the BS may know what X1 is since it is fixed or in a pre-defined range).

According to aspects, based on the capability information, the BS may implicitly know that the UE cannot support some patterns for intra-subframe SRS AS/FH for some value of X1, X2. Thus, based on the received capability information, the BS may determine SRS configuration information for the UE to use for SRS transmissions. For example, in some cases, knowing the UE may support certain SRS transmission patterns (and not other SRS transmission patterns), the BS may only configure (e.g., via the SRS configure information) the UE with feasible patterns (e.g., supported by the UE), considering reported X1 for SRS AS only, X2 for SRS FH only, or max{X1,X2} for SRS FH+AS. In other words, the SRS configuration information received by the UE may include an SRS transmission pattern supported by the UE, wherein the SRS transmission pattern supported by the UE is based, at least in part, on the reported transient time. The UE may then transmit (and the BS receive) at least one SRS in accordance with the SRS configuration information.

In some cases, the capability information may indicate at least one SRS transmission pattern supported by the UE or not supported by the UE for at least one of the antenna switching procedure or the frequency hopping procedure. In some cases, the SRS transmission pattern supported by the UE or not supported by the UE may be different for the antenna switching procedure and the frequency hopping procedure. That is, the UE may support a first SRS transmission pattern for an antenna switching procedure and may support a second SRS transmission pattern for a frequency hopping procedure, where the first SRS transmission pattern is different from the second SRS transmission pattern. As noted above, however, the BS may configure the UE (e.g., via the SRS configuration information) with an SRS transmission pattern supported by the UE, which is described in greater detail below.

Additionally, in some cases, as noted above, the UE may determine a capability related to a power change limitation when performing the SRS transmissions. For example, the UE may determine a maximum number of power changes that the UE may perform during a particular time/subframe. For example, the UE may determine a maximum number of power changes within one subframe common for both antenna switching and frequency hopping during SRS transmission. In some cases, the maximum number of power changes may be defined in X ms, where X may be greater than 1 and (in some cases) predefined. The UE may provide an indication of the maximum number of power changes in the capability information transmitted to the BS. That is, the capability information may comprise an indication of a limitation related to a switching procedure when performing the SRS transmissions. For example, in some cases, the indication of the limitation may comprise an indication of the maximum number of power changes within one subframe common for both antenna switching and frequency hopping, for example, during SRS transmission.

In some cases, the capability information may comprise a separate indication of a maximum number of power changes for intra-subframe antenna switching and for intra-subframe frequency hopping. Further, in some cases, the capability information may comprise an indication of a type of intra-subframe antenna switching supported by UE, which, in some cases, may be based on a required number of power changes for the intra-subframe antenna switching supported by the UE. For example, for a required number of power changes equal to 2 power changes in 1 ms, the UE may provide an indication in the capability information that the type of intra-subframe antenna switching supported by the UE is SRS AS 1T2R. For a required number of power changes equal to 3 power changes in 1 ms, the UE may provide an indication in the capability information that the type of intra-subframe antenna switching supported by the UE is SRS AS 2T4R with 3 antenna pairs switching. For a required number of power changes equal to 4 power changes in 1 ms, the UE may provide an indication in the capability information that the type of intra-subframe antenna switching supported by the UE is SRS AS 1T4R. In some cases, if the UE reports a capability of supporting SRS AS 1T4R, the UE may also indicate the UE can support SRS AS 1T2R as well, since both 1T4R and 1T2R are within a maximum of 4 power changes per 1 ms. According to aspects, as an example, for intra-subframe frequency hopping, the UE may indicate in the capability information that the maximum number of power changes is 4 power changes in 1 ms or a maximum of 7 power changes in 2 ms.

As noted above, the BS may configure the UE with an SRS transmission pattern that is based on at least one of the capability related to transient time (e.g., per-band/per-bandgroup) or the capability related to the power change limitation (per-band/per-band-group), described above. As noted, the SRS transmission pattern may be indicated in the SRS configuration information and may be based on one or more switching procedures performed by the UE during SRS transmission, such as an antenna switching procedure, a frequency hopping procedure, or a power change procedure.

Figure 15:
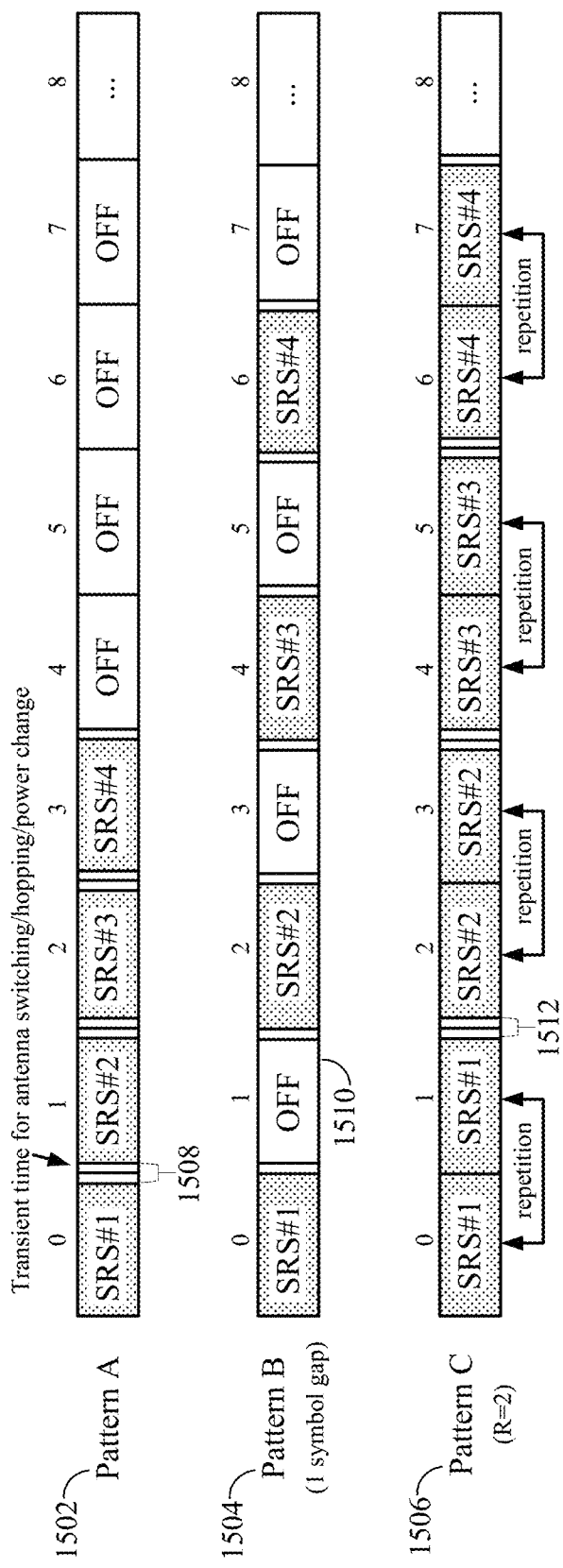
FIG. 15 illustrates example sounding reference signal transmission patterns, in accordance with certain aspects of the present disclosure.

In some cases, the SRS transmission pattern may comprise one of a plurality of different SRS transmission patterns. For example, as illustrated in FIG. 15, the SRS transmission pattern configured by the BS may comprise one of a first pattern 1502 (e.g., Pattern A), a second pattern 1504 (e.g., Pattern B), or a third pattern 1506 (e.g., Pattern C). As illustrated and as an example, the UE may transmit four SRSs according to the SRS transmission pattern. According to aspects, for SRS AS 1T4R, SRS #1, #2, #3, #4 may be transmitted on 4 different SRS antennas, whereas for SRS FH, SRS #1, #2, #3, #4 may be transmitted on 4 different SRS subbands. In some cases, the UE may apply power control parameters included in the SRS configuration information to SRS #1, #2, #3, #4.

According to aspects, as illustrated, the first pattern 1502 may configure the UE, when transmitting at least one SRS, with no additional gap/time (e.g., for the transient time associated with the switching procedure) between SRS symbols associated with the switching procedure and with no SRS repetition on same antenna/subband/power. In other words, the first pattern 1502 does not add any additional time or gap to the transient time associated with the switching procedure and may also configure the UE with no SRS repetition.

For example, as illustrated in the first pattern 1502 of FIG. 15, the UE may transmit a first SRS (e.g., SRS #1) in symbol 0 of a subframe. After transmitting the first SRS, the UE may perform a switching procedure, which requires a transient time 1508 to perform. Thereafter, the UE transmits a second SRS (e.g., SRS #2) in symbol 1 without any additional gap for the transient time for the switching procedure and without SRS repetition. Any resulting performance loss due to a small transient time may be negligible or compensated by the receiver side.

Further, as illustrated, the second pattern 1504 may configure, when transmitting at least one SRS, the UE with a gap of at least one symbol 1510 between SRS symbols associated with the switching procedure. According to aspects, the transient time associated with the switching procedure may occur during this at least one symbol gap.

For example, as illustrated in the second pattern 1504 of FIG. 15, the UE may transmit a first SRS (e.g., SRS #1) in symbol 0 of a subframe. After transmitting the first SRS, the UE may be configured to wait a one-symbol gap 1510 in symbol 1 of the subframe while performing the switching procedure (e.g., the transient time occurs during the one-symbol gap 1510). Thereafter, the UE may then transmit a second SRS (e.g., SRS #2) in symbol 2 of the subframe. While the second pattern 1504 illustrates a one-symbol gap 1510, it should be understood that that gap may comprise any number of symbols greater than or equal to one. However, if the gap is larger than a subframe with 14 symbols, no switching may be allowed within the subframe. Further, while not illustrated, in addition to the gap, the second pattern 1504 may configure the UE with no SRS repetition or an SRS repetition pattern that indicates a number of repetitions to perform of a particular SRS transmission (e.g., R>1).

Further, as illustrated, the third pattern 1506 may configure the UE, when transmitting at least one SRS, with SRS repetitions but no additional gap between SRS transmissions. For example, as illustrated in the third pattern 1506 of FIG. 15, the UE may transmit a first SRS (e.g., SRS #1) in a first symbol (e.g., symbol 0) of a subframe. Thereafter, the UE may repeat transmission of the first SRS in a second symbol (e.g., symbol 1) of the subframe. The UE may then perform a switching procedure. The UE may transmit a second SRS (e.g., SRS #2) in a third symbol (e.g., symbol 2) after transient time 1512 and thereafter repeat transmission of the second SRS in a fourth symbol (e.g., symbol 3). As illustrated, the transient time 1512 associated with the switching procedure may occur within the repeated SRS symbols, which may result in performance loss. However, the resulting performance loss due to transient time 1512 associated with the switching procedure may be mitigated by using the SRS repetition.

According to aspects, the BS may determine which SRS transmission pattern to configure the UE with based on the capability information transmitted by the UE (e.g., capability related to transient time). In some cases, the transmission pattern may also be based on at least one of a signal to noise ratio (SNR) condition, transmission power at the UE, or available resources at network. For example, in some cases, for antenna switching, if the capability information indicates a small transient time (e.g., X2=2 µs for SRS FH) and there is a high SNR condition, the SRS configuration information may indicate the first pattern 1502 for SRS FH). Additionally, for example, in some cases, for antenna switching, if the capability information indicates a medium transient time (e.g., X2=5 µs for SRS FH) and there is a high SNR condition, the SRS configuration information may indicate for the second pattern 1504 for SFS FH. Otherwise, the SRS configuration information may indicate the third pattern 1506 for SFS FH.

In some cases, if the UE transmits capability information indicating a capability to support the first pattern 1502 for FH, the BS may transmit the SRS configuration information configuring the UE with the first pattern 1502, the second pattern 1504, or the third pattern 1506 depending on the scheduling. Otherwise, if the UE cannot support the first transmission pattern 1502, the BS may transmit the SRS configuration information configuring the UE with the second pattern 1504 or the third pattern 1506 depending on the scheduling.

According to aspects, in some cases, for antenna switching, if the UE indicates that the type of intra-subframe antenna switching supported by the UE is AS 1T4R or AS 1T4R+FH, the SRS configuration information may configure the UE with the second pattern 1504, for example, if the transient time associated with AS is medium (e.g., X1=5 µs for SRS AS) and there is a high SNR condition. Otherwise, the SRS configuration information may configure the UE with the third pattern 1506.

In some cases, even if UE does not transmit capability information indicating transient times X1/X2 or supported patterns related to X1/X2, the transient times X1/X2 may, by default, be the same as legacy transient time of 40 us or 20 us for sTTI UEs. In such a case, the first pattern 1502 may not be supported for such default X1/X2 transient time. Thus, in this case, the SRS configuration information may configure the UE with the second pattern 1504 if high SNR or, otherwise, the third pattern 1506.

Figure 16:
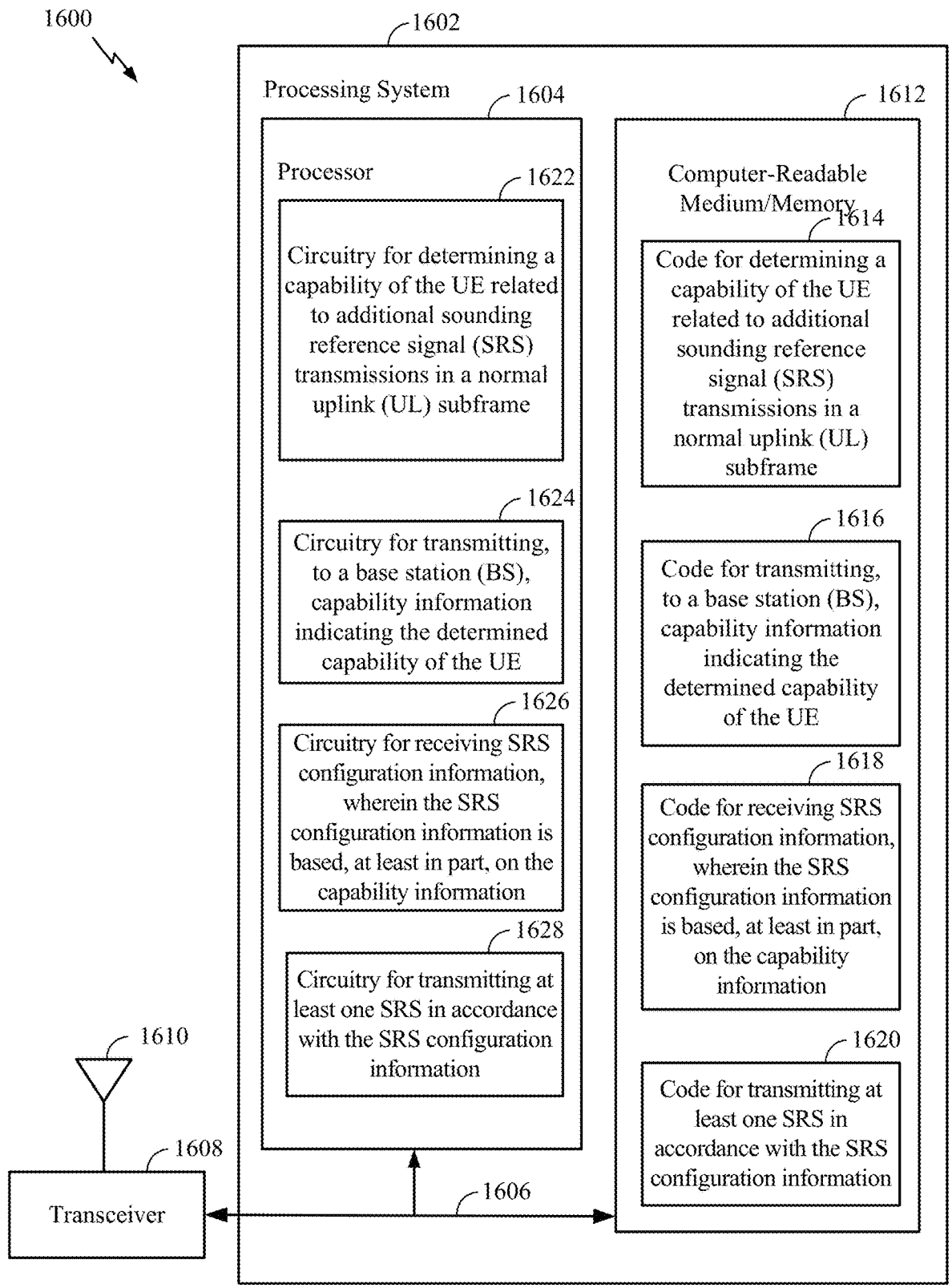
FIG. 16 illustrates a communications device that may include various components configured to perform operations for the techniques disclosed herein in accordance with aspects of the present disclosure.

FIG. 16 illustrates a wireless node 1600 that may include various components (e.g., corresponding to means-plus-function components) configured to perform operations for the techniques disclosed herein, such as the operations illustrated in FIG. 13. The wireless node 1600 includes a processing system 1602 coupled to a transceiver 1608. The transceiver 1608 is configured to transmit and receive signals for the wireless node 1600 via an antenna 1610, such as the various signals as described herein. The processing system 1602 may be configured to perform processing functions for the wireless node 1600, including processing signals received and/or to be transmitted by the wireless node 1600. In some cases, the wireless node may comprise a UE (e.g., UE 120*a*) or a BS (BS 110*a*).

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 13, as well as other operations for capability information for sounding reference signal (SRS) improvements described herein. In certain aspects, computer-readable medium/memory 1612 stores code 1614 for determining a capability of the UE related to additional sounding reference signal (SRS) transmissions in a normal uplink (UL) subframe; code 1616 for transmitting, to a base station (BS), capability information indicating the determined capability of the UE; code 1618 for receiving SRS configuration information, wherein the SRS configuration information is based, at least in part, on the capability information; and code 1620 for transmitting at least one SRS in accordance with the SRS configuration information.

In certain aspects, the processor 1604 includes circuitry configured to implement the code stored in the computer-readable medium/memory 1612. For example, the processor 1604 includes circuitry 1622 for determining a capability of the UE related to additional sounding reference signal (SRS) transmissions in a normal uplink (UL) subframe; circuitry 1624 for transmitting, to a base station (BS), capability information indicating the determined capability of the UE; circuitry 1626 for receiving SRS configuration information, wherein the SRS configuration information is based, at least in part, on the capability information; and circuitry 1628 for transmitting at least one SRS in accordance with the SRS configuration information.

Figure 17:
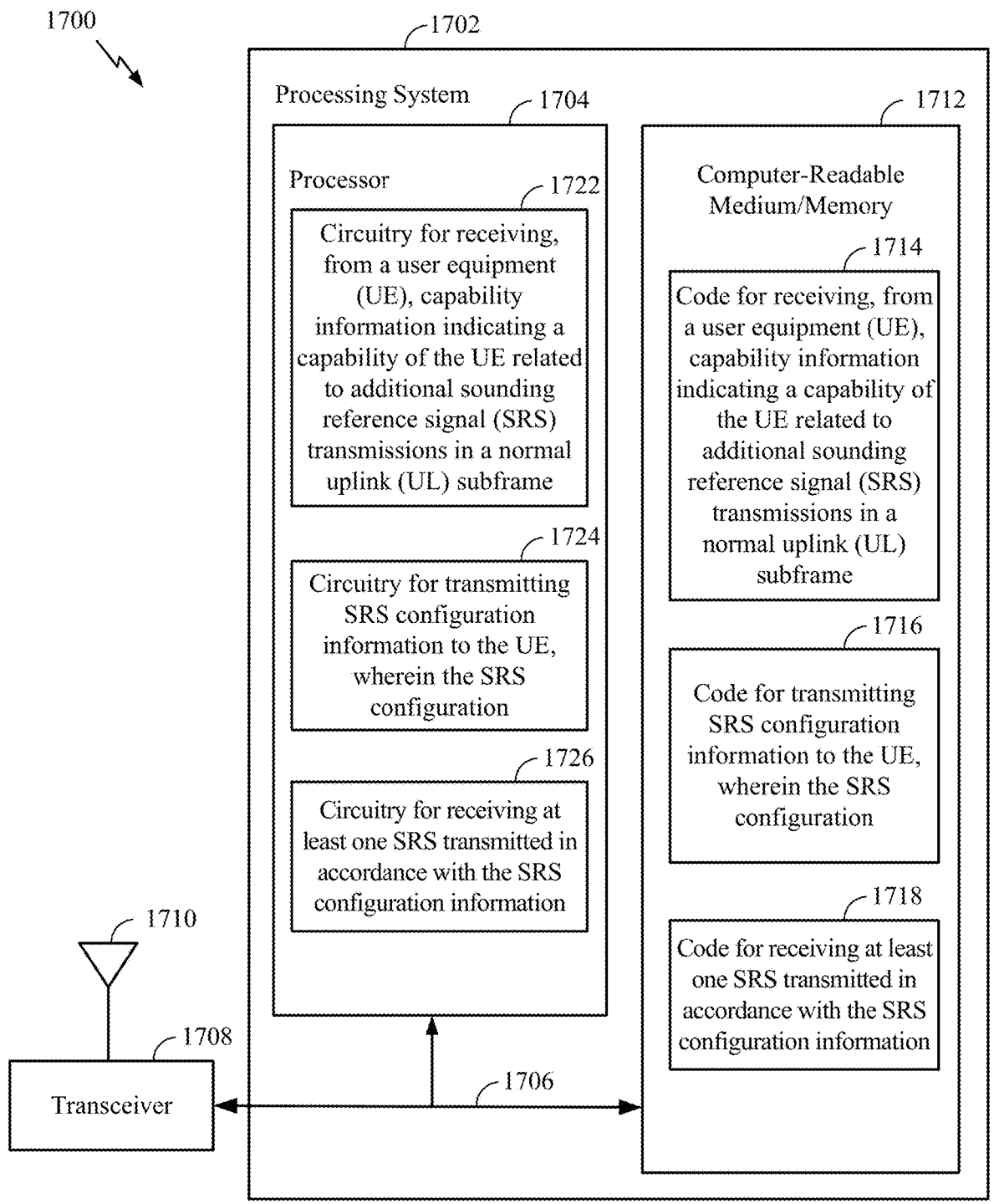
FIG. 17 illustrates a communications device that may include various components configured to perform operations for the techniques disclosed herein in accordance with aspects of the present disclosure.

FIG. 17 illustrates a wireless node 1700 that may include various components (e.g., corresponding to means-plus-function components) configured to perform operations for the techniques disclosed herein, such as the operations illustrated in FIG. 14. The wireless node 1700 includes a processing system 1702 coupled to a transceiver 1708. The transceiver 1708 is configured to transmit and receive signals for the wireless node 1700 via an antenna 1710, such as the various signals as described herein. The processing system 1702 may be configured to perform processing functions for the wireless node 1700, including processing signals received and/or to be transmitted by the wireless node 1700. In some cases, the wireless node may comprise a UE (e.g., UE 120*a*) or a BS (BS 110*a*).

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 14, as well as other operations for capability information for sounding reference signal (SRS) improvements described herein. In certain aspects, computer-readable medium/memory 1712 stores code 1714 for receiving, from a user equipment (UE), capability information indicating a capability of the UE related to additional sounding reference signal (SRS) transmissions in a normal uplink (UL) subframe; code 1716 for transmitting SRS configuration information to the UE, wherein the SRS configuration information is based, at least in part, on the received capability information; and code 1718 for receiving at least one SRS transmitted in accordance with the SRS configuration information.

In certain aspects, the processor 1704 includes circuitry configured to implement the code stored in the computer-readable medium/memory 1712. For example, the processor 1704 includes circuitry 1722 for receiving, from a user equipment (UE), capability information indicating a capability of the UE related to additional sounding reference signal (SRS) transmissions in a normal uplink (UL) subframe; circuitry 1724 for transmitting SRS configuration information to the UE, wherein the SRS configuration information is based, at least in part, on the received capability information; and circuitry 1726 for receiving at least one SRS transmitted in accordance with the SRS configuration information.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-8 and 13-14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication by a user equipment (UE), comprising:
   at least one processor configured to:
      transmit, to a base station (BS), capability information related to a time gap for one or more switching procedures associated with additional sounding reference signal (SRS) transmissions in a normal uplink (UL) subframe, including at least one of an antenna switching procedure, a frequency hopping procedure, or a power change procedure;
      receive SRS configuration information, wherein:
         the SRS configuration information comprises an SRS transmission pattern supported by the UE, and
         the SRS transmission pattern supported by the UE is based, at least in part, on the time gap for at least one of the antenna switching procedure, the frequency hopping procedure, or the power change procedure; and
      transmit at least one SRS in accordance with the SRS configuration information; and
   a memory coupled with the at least one processor.

2. The apparatus of claim 1, wherein the determined capability of the UE comprises a capability related to a limitation related to the one or more switching procedures when performing the additional SRS transmissions.

3. The apparatus of claim 2, wherein the time gap comprises a guard symbol between SRS transmissions when performing the one or more switching procedures.

4. The apparatus of claim 2, wherein the limitation related to the one or more switching procedures comprises a limitation related to at least one of antenna switching or frequency hopping.

5. The apparatus of claim 1, wherein the capability information indicates at least one SRS transmission pattern supported by the UE or not supported by the UE for at least one of the antenna switching procedure or the frequency hopping procedure.

6. The apparatus of claim 1, wherein the SRS configuration information configures the UE with at least one SRS transmission pattern supported by the UE for at least one of the antenna switching procedure or the frequency hopping procedure, wherein the at least one SRS transmission pattern is based on the capability information.

7. The apparatus of claim 6, wherein the at least one SRS transmission pattern configures the UE, when transmitting at least one SRS, with no additional time gap between SRS transmissions.

8. The apparatus of claim 6, wherein the at least one SRS transmission pattern configures the UE, when transmitting at least one SRS, with at least a one-symbol gap between SRS transmissions.

9. The apparatus of claim 6, wherein the at least one SRS transmission pattern is further based on at least one of a signal to noise ratio (SNR) condition, transmission power at the UE, or available resources at network.

10. The apparatus of claim 1, wherein the capability information of the UE is determined on a per-band or per-group basis.

11. An apparatus for wireless communication by a base station (BS) in a network, comprising:
at least one processor configured to:
receive, from a user equipment (UE), capability information indicating a capability of the UE related to a time gap for one or more switching procedures associated with additional sounding reference signal (SRS) transmissions in a normal uplink (UL) subframe, including at least one of an antenna switching procedure, a frequency hopping procedure, or a power change procedure;
transmit SRS configuration information to the UE, wherein:
the SRS configuration information comprises an SRS transmission pattern supported by the UE, and
the SRS transmission pattern supported by the UE is based, at least in part, on the time gap for at least one of the antenna switching procedure, the frequency hopping procedure, or the power change procedure; and
receive at least one SRS transmitted in accordance with the SRS configuration information; and
a memory coupled with the at least one processor.

12. The apparatus of claim 11, wherein the capability of the UE relates to
a limitation related to the one or more switching procedures when performing the additional SRS transmissions.

13. The apparatus of claim 12, wherein the time gap comprises a guard symbol between SRS transmissions when performing the one or more switching procedures.

14. The apparatus of claim 12, wherein the limitation related to the one or more switching procedures comprises a limitation related to at least one of antenna switching or frequency hopping.

15. The apparatus of claim 11, wherein the capability information indicates at least one SRS transmission pattern supported by the UE or not supported by the UE for at least one of the antenna switching procedure or the frequency hopping procedure.

16. The apparatus of claim 11, wherein the SRS configuration information configures the UE with at least one SRS transmission pattern supported by the UE for at least one of the antenna switching procedure or the frequency hopping procedure, wherein the at least one SRS transmission pattern is based on the capability information.

17. The apparatus of claim 16, wherein the at least one SRS transmission pattern configures the UE, when transmitting at least one SRS, with no additional gap between SRS transmissions.

18. The apparatus of claim 16, wherein the at least one SRS transmission pattern configures the UE, when transmitting at least one SRS, with at least one-symbol gap between SRS transmissions.

19. The apparatus of claim 16, wherein the at least one SRS transmission pattern is further based on at least one of a signal to noise ratio (SNR) condition, transmission power at the UE, or available resources at network.

20. The apparatus of claim 11, wherein the capability information of the UE is provided on a per-band or per-group basis.

21. A method for wireless communication by a user equipment (UE), comprising:
transmitting, to a base station (BS), capability information related to a time gap for one or more switching procedures associated with additional sounding reference signal (SRS) transmissions in a normal uplink (UL) subframe, including at least one of an antenna switching procedure, a frequency hopping procedure, or a power change procedure;
receiving SRS configuration information, wherein:
the SRS configuration information comprises an SRS transmission pattern supported by the UE, and
the SRS transmission pattern supported by the UE is based, at least in part, on the time gap for at least one of the antenna switching procedure, the frequency hopping procedure, or the power change procedure; and
transmitting at least one SRS in accordance with the SRS configuration information.

22. The method of claim 21, wherein the determined capability of the UE comprises a capability related to
a limitation related to the switching procedures when performing the additional SRS transmissions.

23. A method for wireless communication by a base station (BS) in a network, comprising:
receiving, from a user equipment (UE), capability information indicating a capability of the UE related to a time gap for one or more switching procedures associated with additional sounding reference signal (SRS) transmissions in a normal uplink (UL) subframe, including at least one of an antenna switching procedure, a frequency hopping procedure, or a power change procedure;

transmitting SRS configuration information to the UE, wherein:
 the SRS configuration information comprises an SRS transmission pattern supported by the UE, and
 the SRS transmission pattern supported by the UE is based, at least in part, on a time gap for at least one of the antenna switching procedure, the frequency hopping procedure, or the power change procedure; and
receiving at least one SRS transmitted in accordance with the SRS configuration information.

24. The method of claim 23, wherein the capability of the UE relates to
 a limitation related to the one or more switching procedures when performing the additional SRS transmissions.

\* \* \* \* \*